US009801328B2

(12) United States Patent
Garner et al.

(10) Patent No.: US 9,801,328 B2
(45) Date of Patent: Oct. 31, 2017

(54) ROW UNIT FOR A SEEDING MACHINE WITH DUAL SEED METERS

(71) Applicant: Deere & Company, Moline, IL (US)

(72) Inventors: Elijah B. Garner, Bettendorf, IA (US); Keith L. Felton, Sherrard, IL (US); Kriss Helmick, Ottumwa, IA (US); Kamalakannan Natarajan, Vellore (IN)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 14/869,708

(22) Filed: Sep. 29, 2015

(65) Prior Publication Data

US 2016/0128268 A1    May 12, 2016

Related U.S. Application Data

(60) Provisional application No. 62/077,030, filed on Nov. 7, 2014.

(51) Int. Cl.
| | |
|---|---|
| *A01C 7/04* | (2006.01) |
| *A01C 19/02* | (2006.01) |
| *A01C 7/12* | (2006.01) |
| *A01C 7/20* | (2006.01) |

(52) U.S. Cl.
CPC .............. *A01C 7/044* (2013.01); *A01C 7/046* (2013.01); *A01C 7/128* (2013.01); *A01C 19/02* (2013.01); *A01C 7/20* (2013.01)

(58) Field of Classification Search
CPC ........... A01C 7/04; A01C 7/042; A01C 7/044; A01C 7/046; A01C 7/20; A01C 7/206; A01C 7/16; A01C 7/12; A01C 7/127; A01C 7/128; A01C 21/005; A01C 19/02

USPC .......................... 111/170, 171, 177, 184, 186
See application file for complete search history.

(56) References Cited

U.S. PATENT DOCUMENTS

| | | | |
|---|---|---|---|
| 2,203,771 | A | 6/1940 | Bennett |
| 2,510,658 | A | 6/1950 | Rassmann |
| 2,960,258 | A | 11/1960 | Dodwell |
| 4,029,235 | A | 6/1977 | Grataloup |
| 4,285,444 | A | 8/1981 | Tye |
| 4,511,061 | A | 4/1985 | Gaspardo |
| 5,170,909 | A | 12/1992 | Lundie et al. |
| 6,173,664 | B1 | 1/2001 | Heimbuch |

(Continued)

FOREIGN PATENT DOCUMENTS

| | | |
|---|---|---|
| DE | 3405361 | 12/1984 |
| EP | 2213152 | 8/2010 |

(Continued)

OTHER PUBLICATIONS

EP15193420.5 Extended European Search Report dated Apr. 5, 2016 (10 pages).

(Continued)

*Primary Examiner* — John G Weiss
(74) *Attorney, Agent, or Firm* — Michael Best & Friedrich LLP

(57) ABSTRACT

A row unit for a seeding machine includes a first seed meter having a first metering member for singulating seeds and a second seed meter having a second metering member for singulating seeds. A motor is operably coupled to the first and second seed meters to selectively drive the first seed meter or the second seed meter.

20 Claims, 23 Drawing Sheets

(56) References Cited

U.S. PATENT DOCUMENTS

| | | | |
|---|---|---|---|
| 6,352,042 B1 | 3/2002 | Martin et al. | |
| 6,516,733 B1* | 2/2003 | Sauder | A01C 21/005 |
| | | | 111/180 |
| 6,527,205 B2 | 3/2003 | Andersson et al. | |
| 6,681,706 B2 | 1/2004 | Sauder et al. | |
| 6,834,600 B1 | 12/2004 | Clewell et al. | |
| 7,140,310 B2 | 11/2006 | Mayerle et al. | |
| 7,343,868 B2 | 3/2008 | Stephens et al. | |
| 7,661,377 B2 | 2/2010 | Keaton et al. | |
| 8,418,634 B2 | 4/2013 | Shoup | |
| 8,543,238 B2 | 9/2013 | Straeter | |
| 8,671,856 B2 | 3/2014 | Garner et al. | |
| 8,850,005 B2 | 9/2014 | Bhatt et al. | |
| 8,850,998 B2 | 10/2014 | Garner et al. | |
| 8,985,037 B2 | 3/2015 | Radtke et al. | |
| 9,516,804 B1 | 12/2016 | Djeu | |
| 9,554,503 B2 | 1/2017 | Noer et al. | |
| 2010/0192818 A1 | 8/2010 | Garner et al. | |
| 2010/0192819 A1 | 8/2010 | Garner et al. | |
| 2010/0224110 A1 | 9/2010 | Mariman | |
| 2011/0219994 A1 | 9/2011 | Gilstring | |
| 2013/0192504 A1 | 8/2013 | Sauder et al. | |
| 2014/0007801 A1 | 1/2014 | Sauder | |
| 2014/0144357 A1 | 5/2014 | Garner et al. | |
| 2014/0182494 A1 | 7/2014 | Friestad et al. | |
| 2014/0230705 A1 | 8/2014 | Radtke et al. | |
| 2014/0352586 A1* | 12/2014 | Straeter | A01C 21/005 |
| | | | 111/171 |
| 2015/0059630 A1 | 3/2015 | Kinzenbaw et al. | |
| 2015/0122163 A1 | 5/2015 | Zumdome et al. | |
| 2015/0223392 A1 | 8/2015 | Wilhelmi et al. | |
| 2015/0230398 A1 | 8/2015 | Garner et al. | |
| 2015/0237794 A1 | 8/2015 | Sauder et al. | |
| 2015/0282422 A1 | 10/2015 | Hahn et al. | |
| 2015/0289441 A1* | 10/2015 | Arnett | A01C 7/046 |
| | | | 111/185 |
| 2015/0319919 A1 | 11/2015 | Saunder et al. | |
| 2015/0351315 A1* | 12/2015 | Wendte | A01C 7/12 |
| | | | 111/183 |
| 2016/0037713 A1* | 2/2016 | Wendte | A01C 21/005 |
| | | | 111/177 |
| 2016/0128267 A1 | 5/2016 | Garner et al. | |
| 2016/0128269 A1 | 5/2016 | Helmick et al. | |
| 2016/0128271 A1 | 5/2016 | Garner et al. | |
| 2016/0128273 A1 | 5/2016 | Garner et al. | |
| 2016/0143212 A1 | 5/2016 | Wendte et al. | |
| 2016/0143213 A1 | 5/2016 | Kowalchuk | |
| 2016/0192580 A1* | 7/2016 | Wendte | A01C 19/02 |
| | | | 111/177 |
| 2016/0227700 A1 | 8/2016 | Wendte et al. | |
| 2016/0337713 A1 | 11/2016 | Harrison | |

FOREIGN PATENT DOCUMENTS

| | | |
|---|---|---|
| EP | 2901832 | 8/2015 |
| EP | 3050418 | 8/2016 |
| FR | 2414288 | 8/1979 |
| WO | 2015031840 | 3/2015 |
| WO | 2015077743 | 5/2015 |

OTHER PUBLICATIONS

EP15193456.9 Extended European Search Report dated Apr. 4, 2016 (10 pages).

EP15193452.8 Extended European Search Report dated Apr. 7, 2016 (6 pages).

EP15193439.5 Extended European Search Report dated Apr. 4, 2016 (7 pages).

EP15193449.4 Extended European Search Report dated Apr. 5, 2016 (10 pages).

Kinze, "Kinze Announces the World's First Electric Multi-Hybrid Concept Planter" (2013) 3 pages, http://www.kinze.com/article.aspx?id=167&Kinze+Announces+the+World's+First+Electric+Multi-Hybrid+Concept+Planter, Kinze Manufacturing, Inc.

Baxley, B, "Kinze Announces the World's First Electric Multi-Hybrid Concept Planter," announcement (2013) 2 pages, Kinze Manufacturing, Inc.

Office Action from the US Patent and Trademark Office for U.S. Appl. No. 14/869,723 dated Dec. 30, 2016 (9 pages).

Office Action from the US Patent and Trademark Office for U.S. Appl. No. 14/869,742 dated Feb. 23, 2017 (17 pages).

Office Action from the US Patent and Trademark Office for U.S. Appl. No. 14/869,671 dated Jan. 17, 2017 (10 pages).

Office Action from the US Patent and Trademark Office for U.S. Appl. No. 14/869,693 dated Jan. 4, 2017 (12 pages).

* cited by examiner

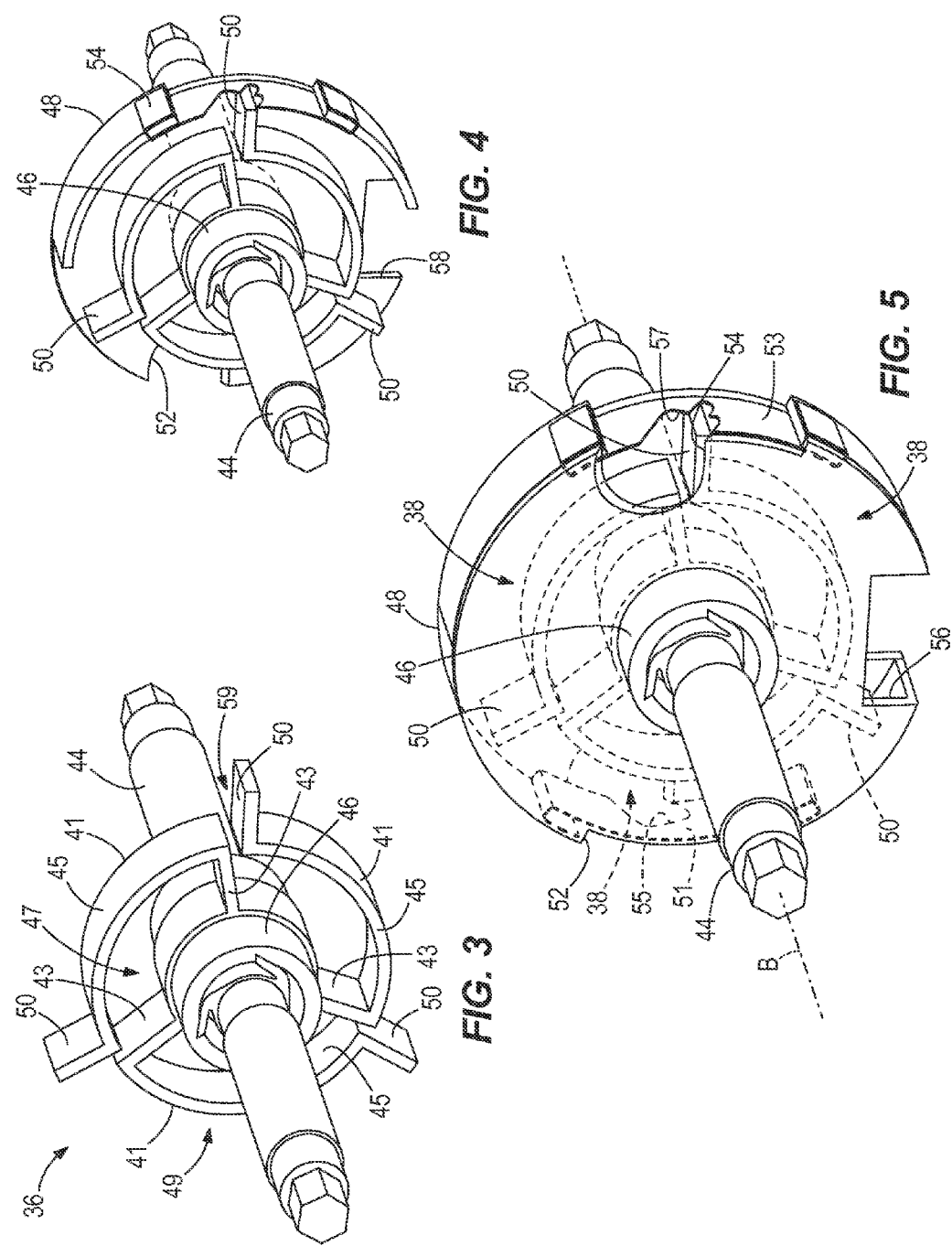

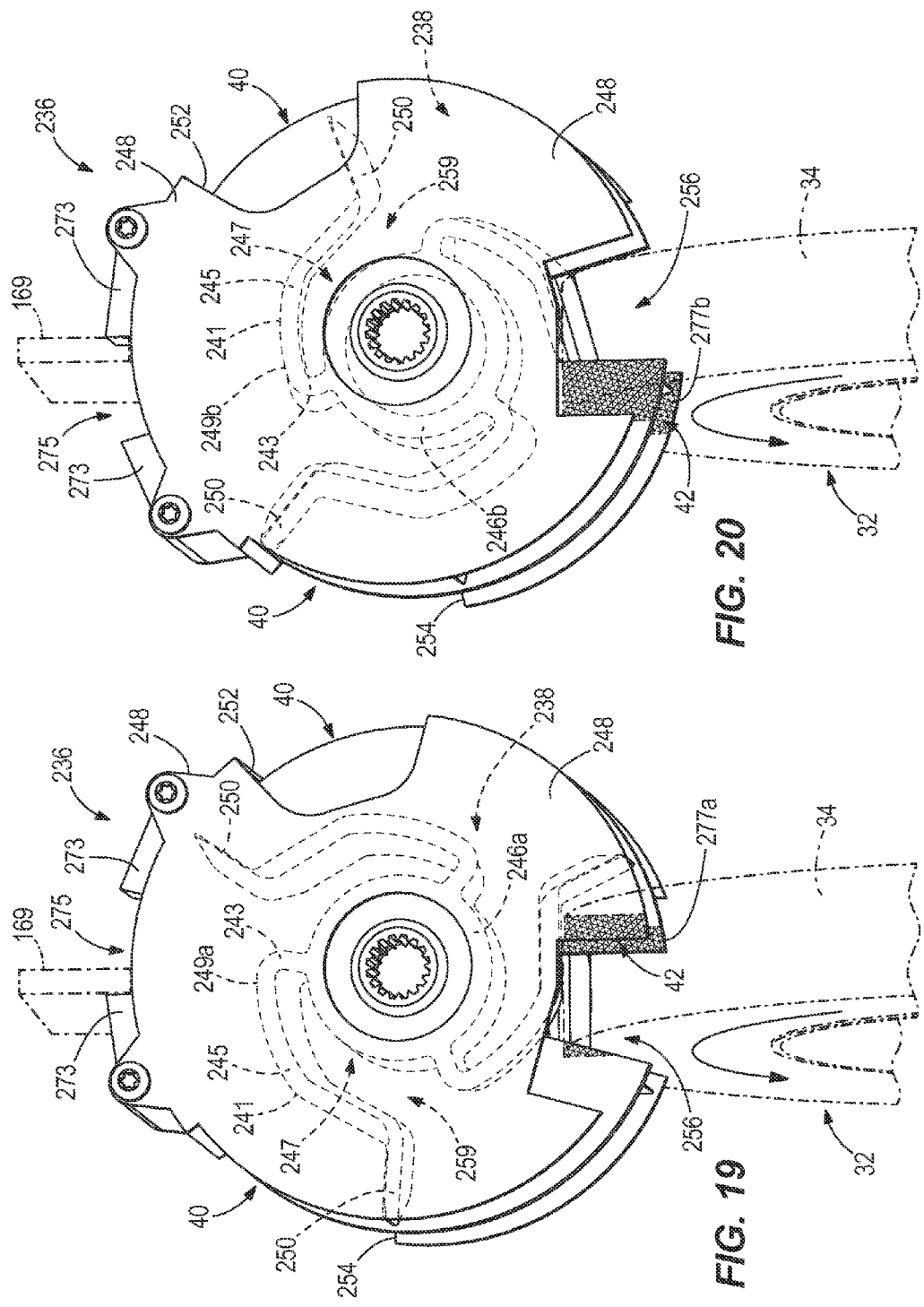

ROW UNIT FOR A SEEDING MACHINE WITH DUAL SEED METERS

CROSS-REFERENCE TO RELATED APPLICATIONS

This application claims priority to U.S. Provisional Patent Application No. 62/077,030 filed on Nov. 7, 2014, the contents of which are incorporated by reference herein.

BACKGROUND

The present disclosure relates to a row unit for a seeding machine, such as a row crop planter for agricultural applications. More specifically, the present disclosure relates to a row unit having a seed meter and a seed delivery mechanism.

SUMMARY

In one aspect, the disclosure provides a row unit for a seeding machine. The row unit includes a first seed meter having a first metering member for singulating seeds, and a second seed meter having a second metering member for singulating seeds. A motor is operably coupled to the first and second seed meters to selectively drive the first seed meter or the second seed meter.

In another aspect, the disclosure provides a row unit for a seeding machine. The row unit includes a first seed reservoir for holding a first variety of seeds, a second seed reservoir for holding a second variety of seeds, and a seed meter assembly in communication with the first and second seed reservoirs for selectively moving seeds from the first seed reservoir or the second seed reservoir. A motor is operably coupled to the seed meter assembly to selectively drive movement of seeds from the first seed reservoir or from the second seed reservoir.

Other aspects of the invention will become apparent by consideration of the detailed description and accompanying drawings.

BRIEF DESCRIPTION OF THE DRAWINGS

FIGS. 3-5 are perspective views of one construction of the seed loader of FIG. 2.

FIGS. 17-22 are various views of yet another construction of the seed loader of FIG. 2 disposed in the seeding machine.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

Figure 1:
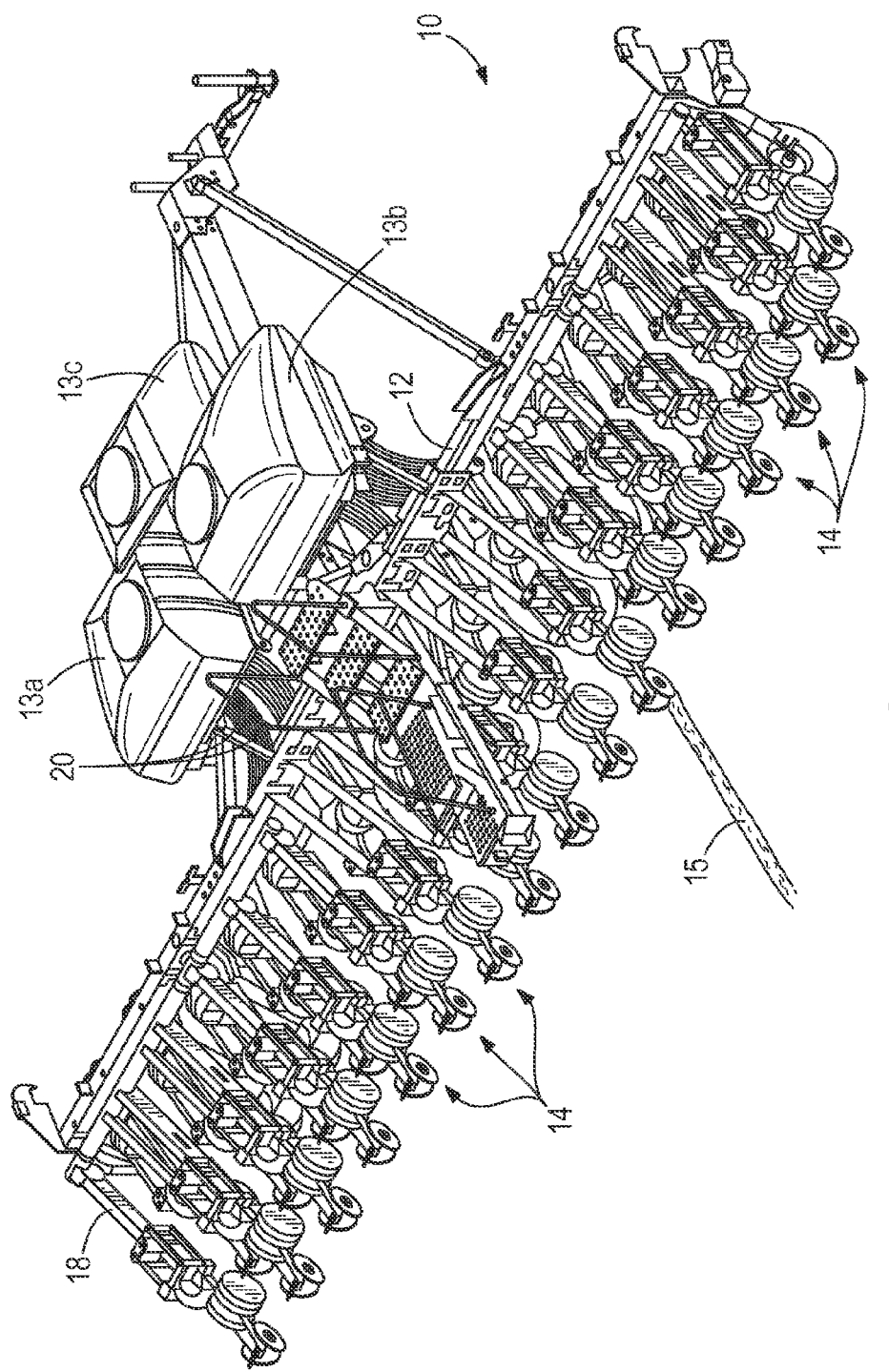
FIG. 1 is a perspective view of a seeding machine.

FIG. 1 illustrates a seeding machine 10, such as a row crop planter. The seeding machine 10 has a frame 12 on which are mounted a plurality of individual row units 14. Seed sources, such as storage tanks 13a-13c, hold seed that is delivered, e.g., pneumatically, to a mini-hopper (not shown) on each row unit 14. The storage tanks 13a-13c may be coupled to the mini-hoppers by way of conduits 20, such as hoses, and a pressurized delivery apparatus (not shown). Each storage tank 13a-13c can be used to contain the same variety of seeds, or a different variety of seeds. For example, a first storage tank 13a may contain a first variety of seeds, a second storage tank 13b may contain a second variety of seeds, and a third storage tank 13c may contain a third variety of seeds. The varieties are typically within the same crop (such as corn, soy, etc.), with each variety having different traits which allows a more optimal variety to be planted at a given location in a field. The traits may include tolerances of seed to disease, draught, moisture, pests, and other seed characteristics, etc. It may also be possible for the different varieties to include plant type, such as corn, soy, etc. For example, the first storage tank 13a may contain corn, the second storage tank 13b may contain soy, and the third storage tank 13c may contain a more moisture tolerant variety of corn or soy. Thus, each row unit 14 can be coupled to several conduits 20 such that each row unit 14 is coupled to each storage tank 13a-13c to receive the first, second, and third varieties of seed. In other constructions, the storage tanks 13a-13c may contain the same variety of seed.

Each row unit 14 has a frame 18 to which the components of the row unit 14 are mounted. For example, the frame 18 may carry furrow opening disks for forming an open furrow 15 in the soil beneath the seeding machine 10 into which seed is deposited, and closing and packing wheels to close the furrow 15 over the deposited seed and to firm the soil in the closed furrow 15.

Figure 2:
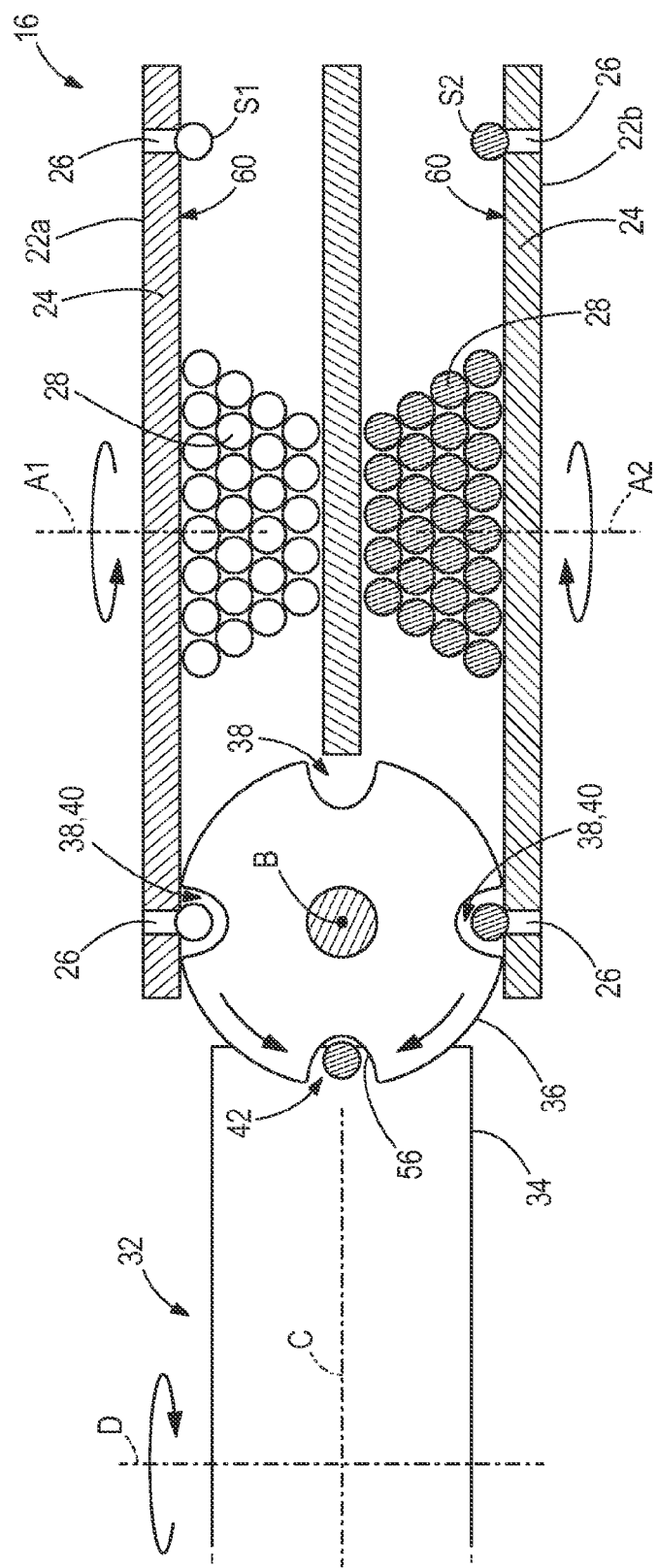
FIG. 2 is a schematic diagram of a seed loader for the seeding machine of FIG. 1.
Figure 7:
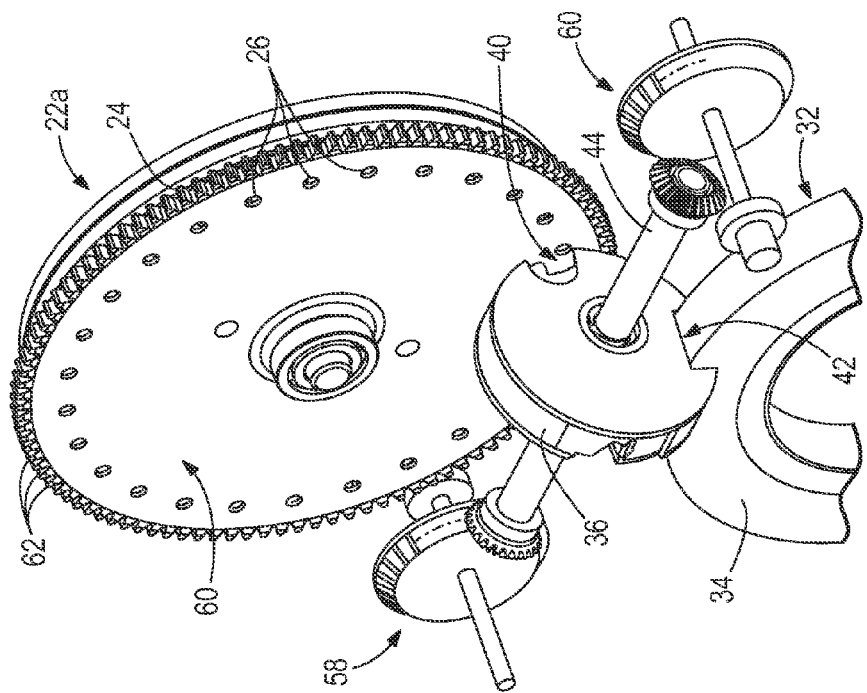
FIGS. 6-11 are various views of the seed loader of FIGS. 3-5 disposed in the seeding machine.
Figure 6:
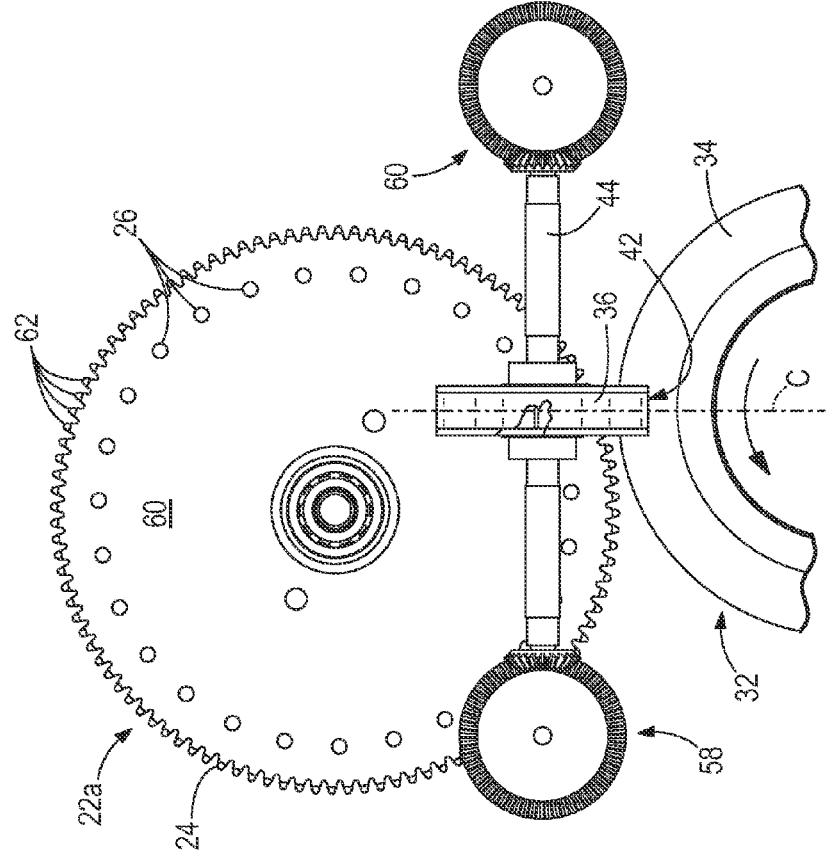
Figure 9:
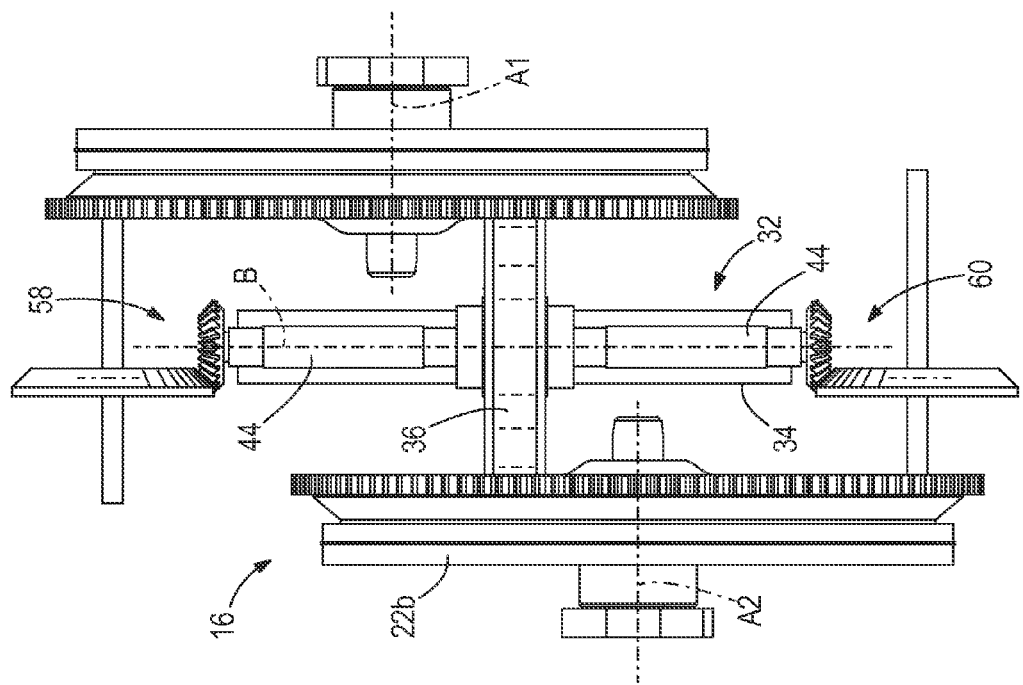
Figure 8:
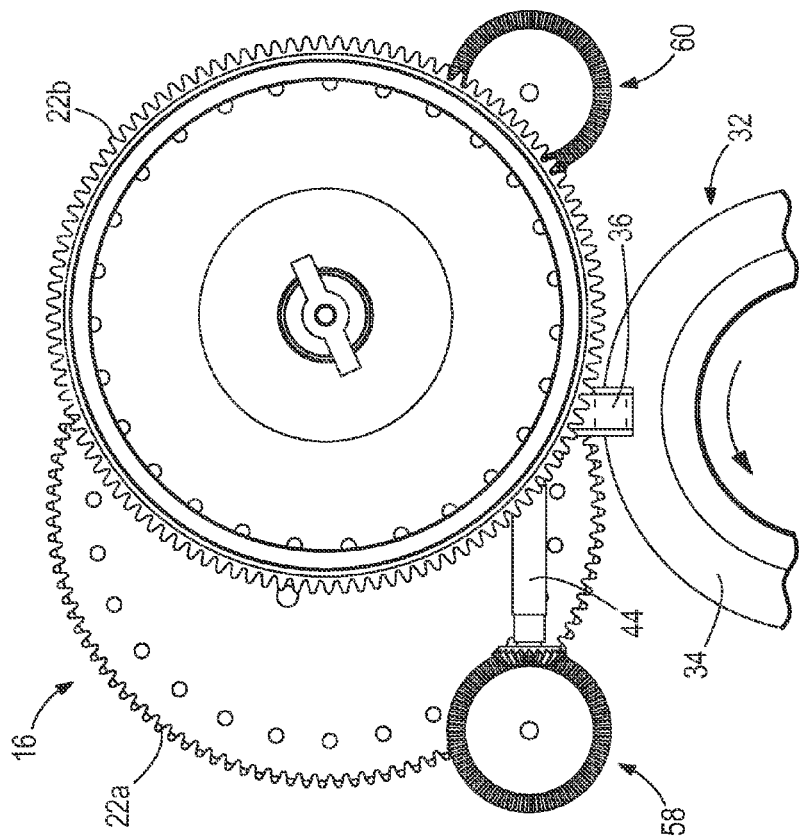
Figure 10:
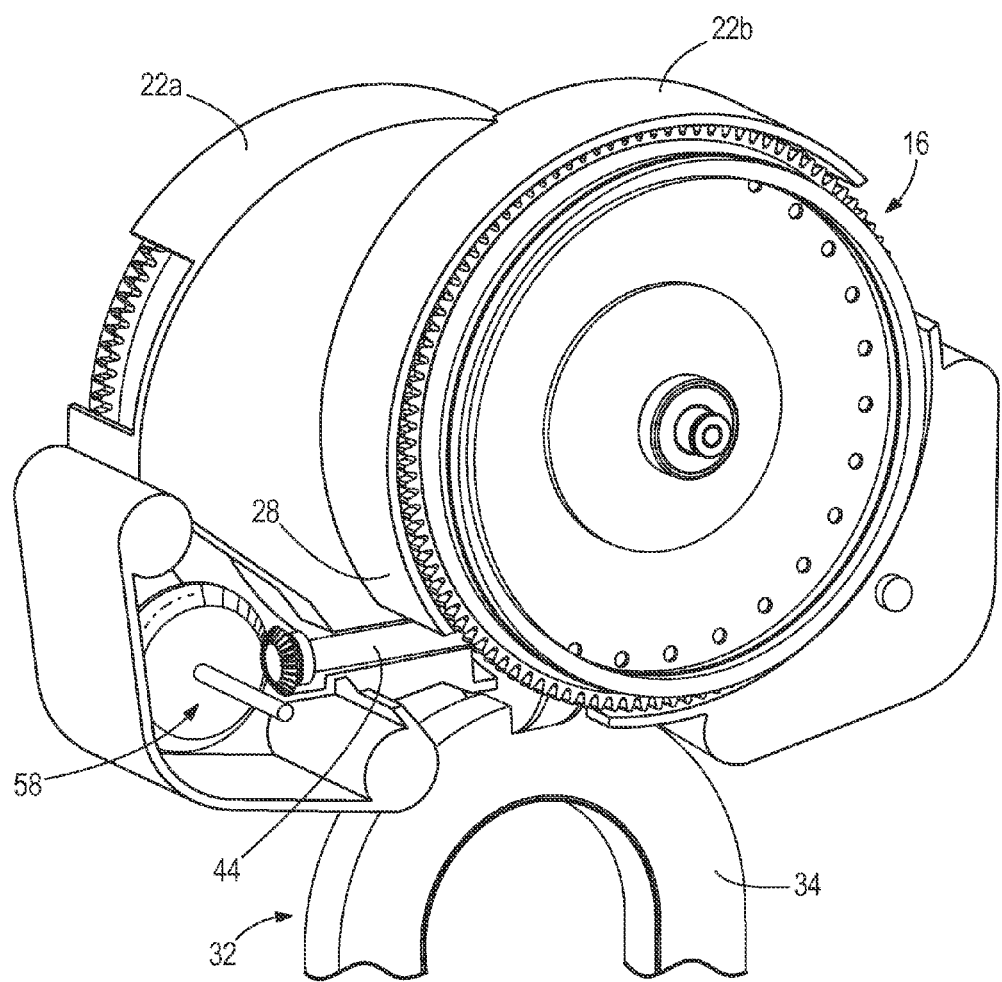
Figure 11:
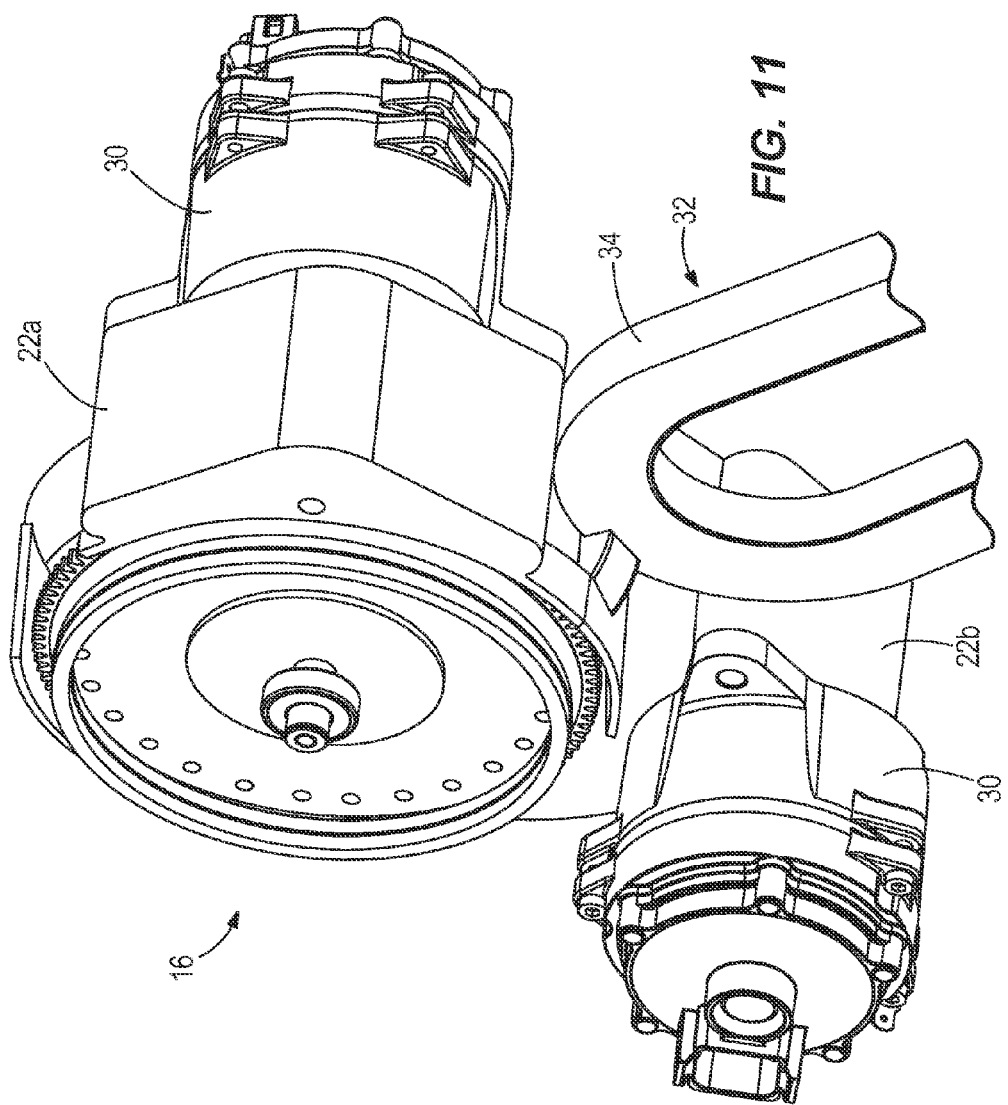

In general, and with reference also to FIG. 2 for context, a seed meter assembly 16 having two seed meters 22a, 22b is coupled to each row unit frame 18. The seed meter assembly 16 may have one, two, three or more seed meters coupled to each row unit frame 18. The illustrated seed meters 22a, 22b are substantially the same, with like parts labeled with the same or similar reference numerals herein. In other constructions, the seed meters 22a, 22b may be different (for example, two different types of seed meters may be used). Each seed meter 22a, 22b takes seeds from a seed pool and sequentially discharges single seeds for delivery one at a time (e.g., meters, or singulates, the seeds). As one example, each seed meter 22a, 22b may use an air pressure differential, (i.e., vacuum and/or positive pressure), to adhere seeds to a metering member 24, which can be in the form of a disk, a bowl, or more generally a plate, having apertures 26 that extend therethrough. The apertures 26 are generally arranged circumferentially about a meter axis A1, A2 (respectively), substantially in a circle, proximate an outer edge of the metering member 24. The metering member 24 may be driven by a motor 30, such as an electric motor (see FIG. 11, for example). In other constructions, other types of motors, such as hydraulic, pneumatic, etc. may be used as well as various types of mechanical drives.

A seed reservoir 28 containing a seed pool is positioned on one side of each metering member 24 at a lower portion thereof, and is connected to one or more of the storage tanks 13a-13c to receive seeds therefrom by way of the conduits 20. A pressure differential is applied across the metering member 24, which rotates about the meter axis A1 or A2 through the seed pool such that individual seeds S1, S2 (FIG. 2) from the respective seed pool are adhered or attracted by virtue of the pressure differential to the passing apertures 26. In order to release a seed, one seed at a time (e.g., to meter, or singulate, the seeds), the pressure differential is terminated at a desired release position, though in other embodiments the differential is maintained and mechanical assistance is utilized to knock, pull, or push the seed off the metering member 24, interfere with the aperture to disrupt the pressure differential, or otherwise release the seed. In yet other constructions, other types of metering members for metering/singulating the seeds may be employed.

A seed delivery mechanism 32 is also coupled to each row unit frame 18. The seed delivery mechanism 32 receives metered seeds from each seed meter 22a, 22b and delivers the seeds to the furrow 15 in the soil. The seed delivery mechanism 32, or conveyor, may include a conduit such as a belt 34, which receives the metered seeds from each seed meter 22a, 22b, conveys the metered seeds toward the ground, and expels the metered seeds in the furrow 15. The belt 34 is driven through one or more pulleys (not shown) rotating about an axis D (FIG. 2) by a motor, such as an electric motor, or by any hydraulic or pneumatic drive as well as various types of mechanical drives. The belt 34 can be in the form of a brush belt 34 with bristles for trapping, holding, and releasing the metered seeds whereby the seed movement between the seed meter and the furrow is controlled. In other constructions, the seed delivery mechanism 32 may include other types of belts, such as a foam belt, a conveyor belt, a flighted belt, a pocketed belt, a belt with resilient fingers, etc. In yet other constructions, the seed delivery mechanism 32 can include other types of mechanisms suitable for receiving seeds from each seed meter 22a, 22b and conveying the seeds to the furrow 15. For example, the seed delivery mechanism 32 may include other conduits such as one or more tubes to direct seeds from each seed meter 22a, 22b to the furrow 15.

Two or more seed meters 22a, 22b are coupled to each row unit frame 18. The first seed meter 22a is in communication with one seed source (e.g., one of the storage tanks 13a-13c), and the second seed meter 22b is in communication with another seed source (e.g., another one of the storage tanks 13a-13c), and so on. As illustrated in FIG. 2, the first and second seed meters 22a, 22b may be arranged generally in parallel such that the respective meter axes A1, A2 are substantially coaxial. In other constructions, such as illustrated in the constructions of FIGS. 8-11, 12-15 and 16-21, the first and second meters 22a, 22b may be arranged such that the respective meter axes A1, A2 are generally parallel but offset by a certain distance. In other similar constructions, the first and second meters 22a, 22b may be tilted with respect to each other such that the meter axes A1, A2 intersect with a small included angle. In yet other constructions, the seed meter assembly 16 may include a single seed meter configured to selectively meter seeds from two or more different seed sources, or alternatively, three or more seed meters may be coupled to each row unit frame 18 and in communication with one or more of the storage tanks 13a-13c.

A seed loader 36 is disposed between the first and second seed meters 22a, 22b. FIGS. 3-11 illustrate a first construction of the seed loader 36 as a single-wheel loader, FIGS. 12-16 illustrate a second construction of the seed loader 136 also as a single-wheel loader, and FIGS. 17-22 illustrate a third construction of the seed loader 236 as a dual-wheel loader. Generally, the seed loader 36, 136, 236 is positioned for selectively receiving metered seeds from one (or both) of the first and second seed meters 22a, 22b and transferring metered seeds to the seed delivery mechanism 32. In other constructions, the seed loader 36, 136, 236 may be disposed adjacent a single seed meter and used to transfer metered seeds from the single seed meter (22a or 22b) to the seed delivery mechanism 32.

The seed loader 36, 136, 236 is a rotating seed loader mounted for rotation about a loader axis B disposed generally perpendicular to at least one or both of the meter axes A1, A2. In some constructions, e.g., the first and second seed meters 22a, 22b are tilted with respect to one another, the loader axis B may be disposed transverse to the meter axes A1, A2 but not necessarily perpendicular.

As illustrated schematically in FIG. 2, the seed loader 36, 136, 236 includes receptacles 38 for receiving a seed from the seed meters 22a, 22b at a pickup location 40. The receptacles 38 are configured to rotate about the loader axis B to transfer the seed in a circumferential path from the pickup location 40 to a drop off location 42 at the seed delivery mechanism 32.

It should be understood that FIG. 2 is merely schematic, and that the number, spacing, and structure of the receptacles 38 and the loader 36, 136, 236 may vary between constructions. In one construction, four receptacles 38 are employed, and the receptacles 38 are spaced about 90 degrees apart about the loader axis B. However, the receptacles 38 may be spaced unevenly about the loader axis B in other constructions. Furthermore, one, two, three, five, or more receptacles 38 may be employed in other constructions and may be spaced evenly or unevenly about the loader axis B. The constructions of the seed loader 36, 136, 236 illustrated herein have three receptacles 38.

FIGS. 3-11 and FIGS. 12-16 illustrate two constructions of a single-wheel seed loader 36, 136. The seed loader 36, 136 includes a shaft 44, 144, a hub portion 46, 146, a housing 48, 148, and a sweeper 49, 149. Like features of the seed loader 36 and the seed loader 136 need not be described separately herein and are labeled with the same or similar reference numerals plus 100. The hub portion 46, 146 is coupled to the shaft 44, 144 for rotation therewith about the loader axis B and includes a sweeper 49, 149 extending therefrom for sweeping a seed from the seed meters 22a, 22b. The shaft 44, 144 hub portion 46, 146 and sweeper 49, 149 rotate with respect to the frame 18. In the illustrated construction, the sweeper 49, 149 comprises paddles 50, 150 extending radially from the hub portion 46, 146 for sweeping a seed from the respective seed meter 22a, 22b. Three paddles 50, 150 define three receptacles 38, 138 (FIG. 5, FIG. 14) for receiving seeds, each receptacle 38, 138 being defined as the space or compartment within the housing 48, 148 between successive paddles 50, 150 and the hub portion 46, 146 in which the seed is received and moved from the pickup location 40 to the drop off location 42. The paddles 50, 150 are spaced approximately evenly about the loader axis B by angular distances of about 120 degrees, but it is to be understood that fewer or more paddles 50, 150 may be employed to define fewer or more receptacles 38, 138, and that the paddles may be spaced evenly or unevenly.

Each paddle 50, 150 is coupled to the hub portion 46, 146 in a cantilevered fashion by way of an arm 41, 141, which allows radial and/or circumferential flexion capability. Each paddle 50, 150 extends from the arm 41, 141 and may be radial or oblique with respect to the axis B. In the illustrated constructions, each arm 41, 141 includes a first portion 43, 143 extending generally radially from the hub and a second portion 45, 145 extending generally circumferentially from the first portion 43, 143 leaving a first gap 47, 147 between the hub portion 46, 146 and the second portion 45, 145 in a radial direction and a second gap 59, 159 between the paddle 50, 150 and the adjacent arm 41, 141 in a circumferential direction. The paddle 50, 150 extends generally radially from the second portion 45, 145. As such, the provision of the first and second gaps 47, 147, 59, 159 allows room for flexion of each arm 41, 141 and of each paddle 50, 150 in radial and circumferential directions, for example in response to engagement of the paddles 50, 150 with the belt 34 of the seed delivery mechanism 32 (which will be described in greater detail below) or in response to engagement of the paddles 50, 150 with other components, such as the seed meters 22a, 22b and with the seeds themselves. The first gap 47, 147 may be filled with an elastic material, such as foam or resin, to inhibit seeds from being trapped in the seed loader 36, 136.

Figure 13:
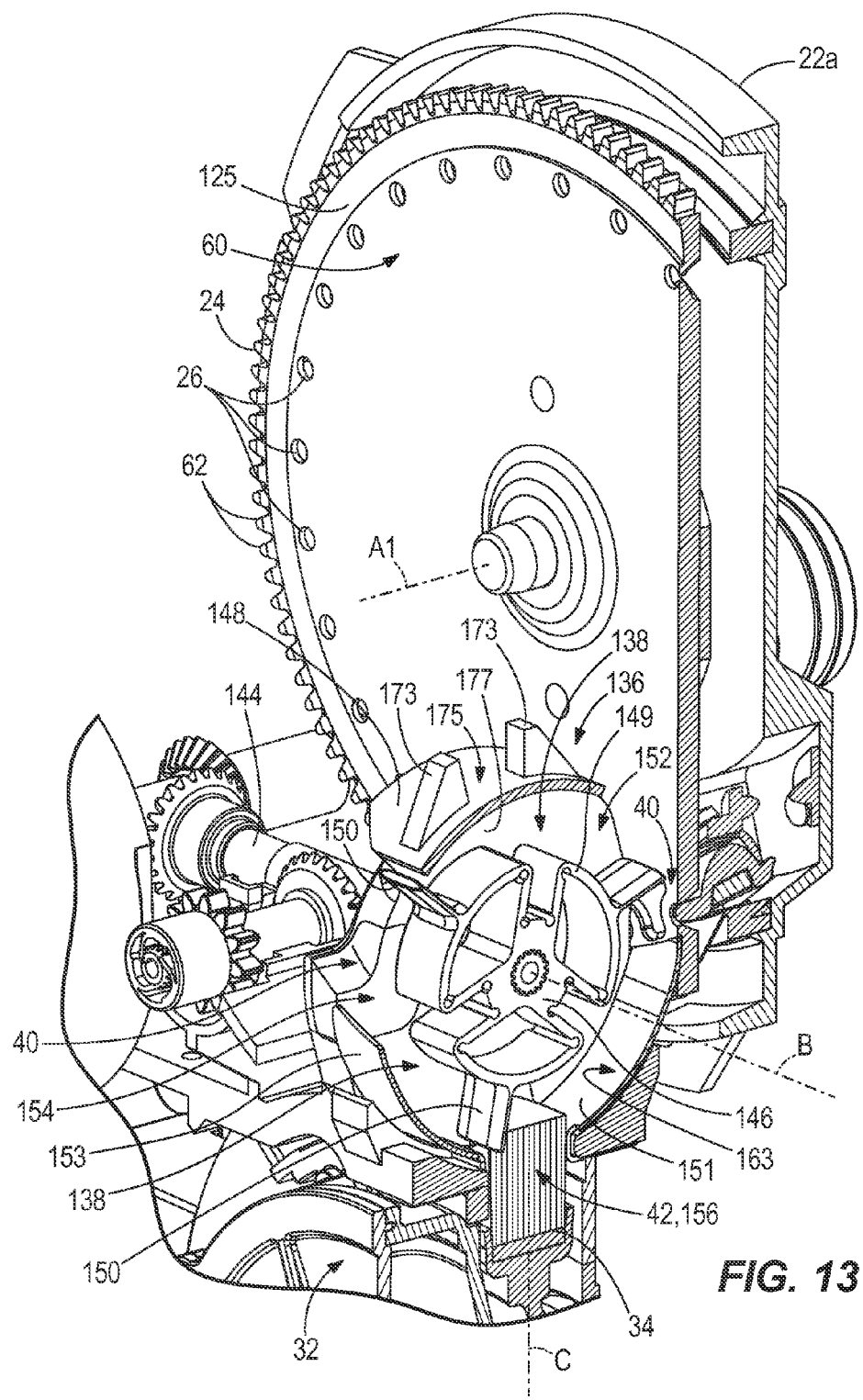
Figure 14:
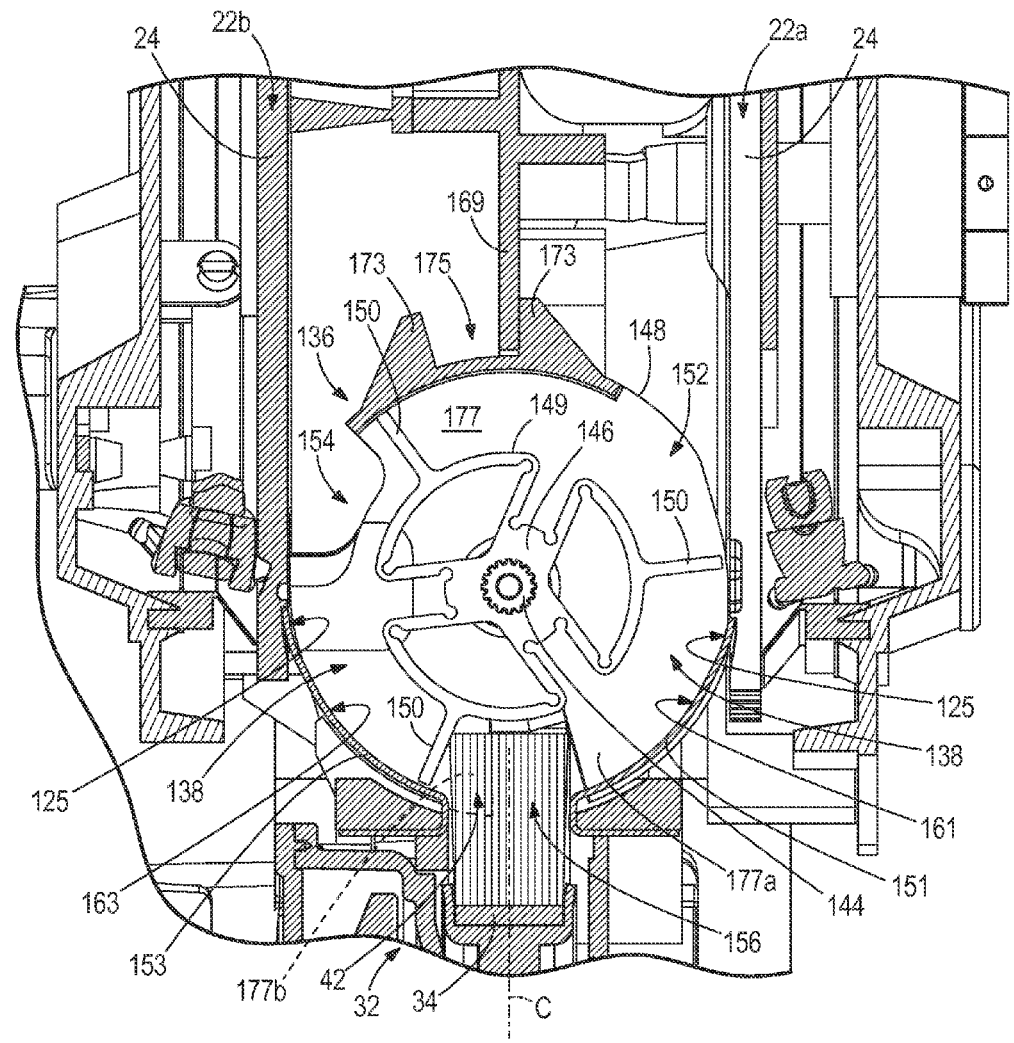
Figure 15:
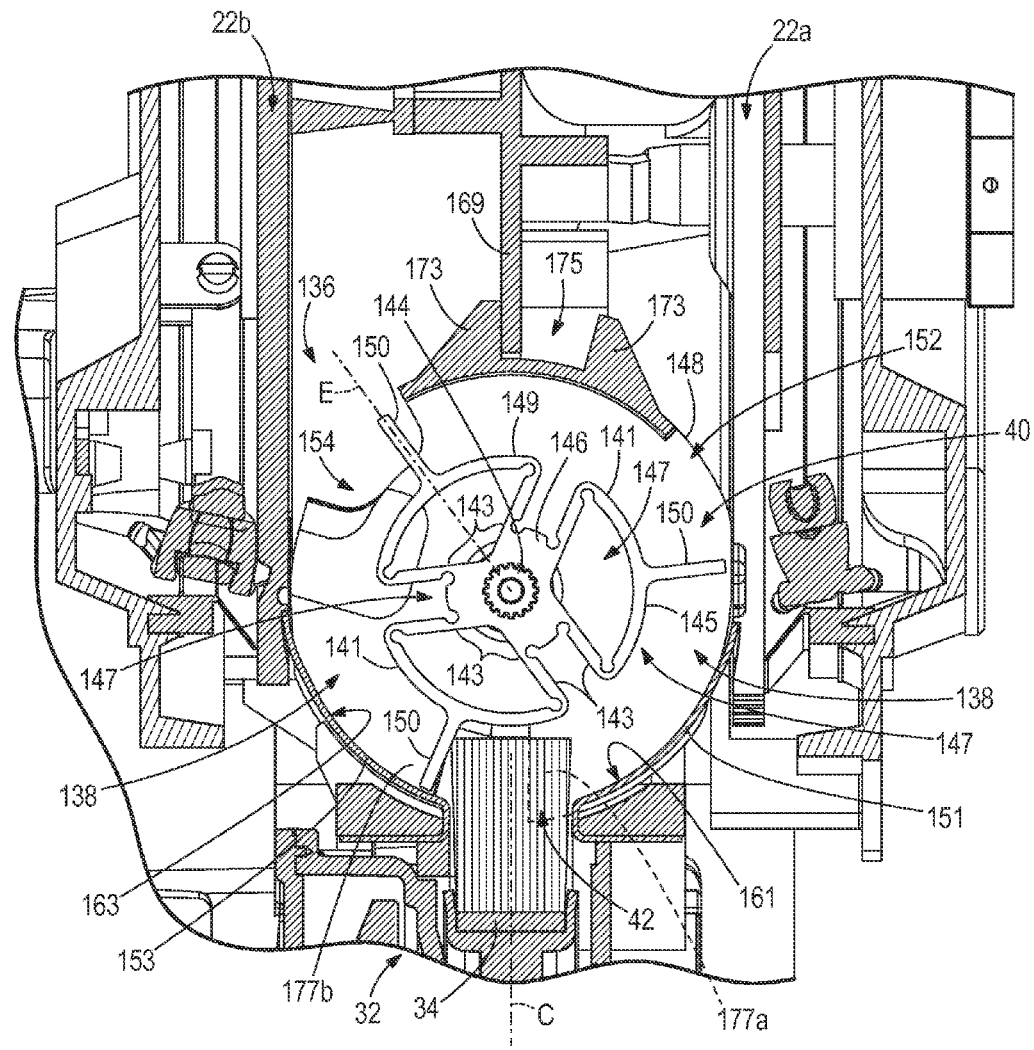

With reference to the construction of FIGS. 12-15, the first portion 143 is forked including two extensions each connecting to the second portion 145 at opposite ends such that each sweeper 149 is substantially symmetrical about a radial axis E (FIG. 15). The symmetrical construction of each sweeper 149 allows each paddle 150 to flex and react to forces the same way when the seed loader 136 is rotating counterclockwise and clockwise.

Rather than paddles 50, 150, the sweeper 49, 149 may also include other mechanisms for sweeping the seed, such as brushes, bristles, foam, resilient fingers, etc. Some sweeper mechanisms, such as a brush wheel and a foam wheel, may be continuous about the loader axis B, and may effectively define as many receptacles 38, 138 as locations at which a seed may be received.

The housing 48, 148 includes a first meter opening 52, 152 disposed adjacent the first seed meter 22a, a second meter opening 54, 154 disposed adjacent the second seed meter 22b, and a delivery opening 56, 156, or outlet, disposed adjacent and in communication with the seed delivery mechanism 32. The first meter opening 52, 152 and the second meter opening 54, 154 correspond with the pickup locations 40. Inserts 51, 53 (FIG. 5) and 151, 153 (FIGS. 13-14) made from spring steel or other low-wearing material are disposed proximate each meter opening 52, 54, respectively. The inserts 51, 53, 151, 153 may also be referred to herein as ramps.

With reference to the construction of FIGS. 3-11, and as shown specifically in FIGS. 3-5, each insert 51, 53 can be retained in place over/across/at/proximate each opening 52, 54 in any manner desired (e.g., bent-over ends that mate with features of the housing 48, snap-fit, fastened, etc.), and can have an aperture 55, 57 (respectively) shaped and sized to permit seed to pass. The inserts 51, 53 inhibit wear on the seed loader 36 and may be replaceable as needed. In some constructions, the openings 52, 54 may be sized and shaped to permit certain varieties of seed (e.g., significantly different sizes of seed) to pass and may be interchanged depending on the variety of seed being used.

Figure 12:
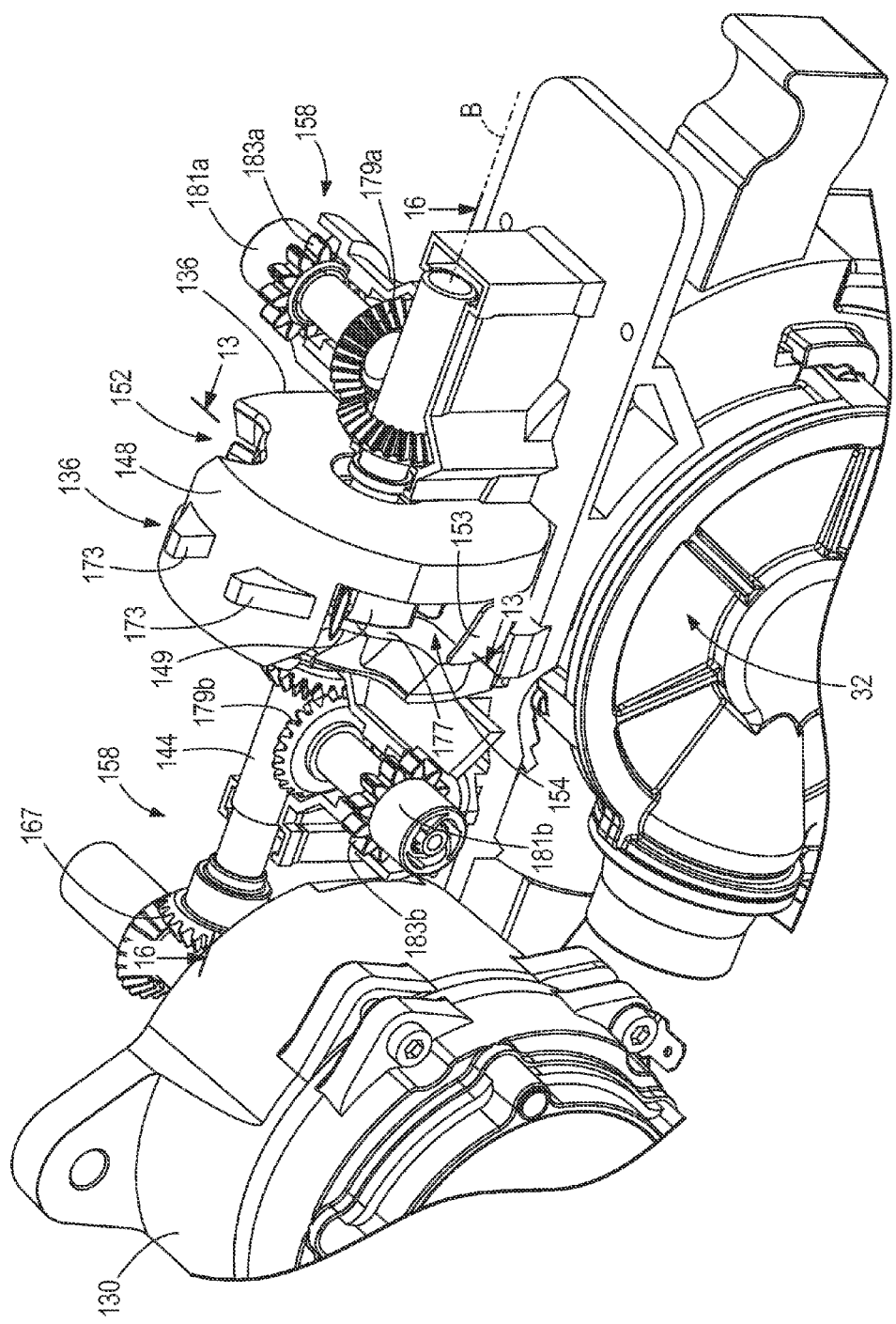
FIGS. 12-16 are various views of another construction of the seed loader of FIG. 2 disposed in the seeding machine.

With reference to the construction of FIGS. 12-15, and with particular reference to FIGS. 13-14, each insert 151, 153 is received in a recessed groove 125 in the respective metering member 24. The recessed groove 125 is recessed from a surface of the metering member 24, such as a seed surface 60 in communication with the seed pool and to which metered seeds are attracted. The recessed groove 125 is substantially arcuate with respect to the respective metering axis A1, A2 and, more specifically, may be substantially circular. As the seed meters 22a, 22b rotate in frictional engagement with the inserts 151, 153, the inserts 151, 153 are recessed in the circular recessed groove 125 and remain stationary with respect to the frame 18. When other types of metering members are employed, it should understood that the groove 125 may have other corresponding shapes and configurations. The inserts 151, 153 each have a respective ramp surface 161, 163 inclined from the first meter opening 152 and the second meter opening 154, respectively, to the delivery opening 156, that guide the seed through the seed loader 136 from the first and second seed meters 22a, 22b to the seed delivery mechanism 32. Specifically, the ramp surfaces 161, 163 may be arcuate with respect to the loader axis B for cooperating with the sweeper 149 to guide seeds. The ramp surfaces 161, 163 are flush with or recessed from the respective surface of the metering member 24 so as to facilitate a smooth, uninhibited path for each seed to travel from the first and second meter openings 152, 154 to the delivery opening 156. The inserts 151, 153 may engage the seed delivery mechanism 32, e.g., the conduit 34, to reduce gaps that could trap seeds unintentionally.

Returning to the seed loaders 36, 136, the sweeper 49, 149 may or may not contact the metering member(s) 24 and may engage the seed while the seed is still adhered to the metering member(s) 24 by vacuum, after the vacuum is released, broken, disrupted, etc., or after the seed is otherwise released from the metering member(s) 24. Any one or more of the housing 48, 148 the paddles 50, 150 the inserts 51, 53 and 151, 153, etc. may contact the metering member(s) 24 while sweeping a seed from the metering member(s) 24, or may receive the seed without contacting the metering member(s) 24, or may engage the metering member 24 of one of the seed meters 22a, 22b and not the other of the seed meters 22a, 22b. For example, the paddles 50, 150 may engage the metering member(s) 24 to sweep a seed that is adhered to the metering member(s) 24 by pressure differential. As such, the paddles 50, 150 may break the seed away from adherence with the metering member(s) 24 by contact with the seed and metering member(s) 24. In other constructions, the paddles 50, 150 may break the seed away from adherence with the metering member(s) 24 by contact with the seed without contacting the metering member(s) 24. In yet other constructions, a gap may be disposed between the sweeper 49, 149 and the metering member(s) 24 such that the sweeper 49, 149 receives a seed after the seed is released from the metering member(s) 24 without engaging the metering member(s) 24.

With reference to the construction of FIGS. 3-11, the housing 48 is fixed against rotation with respect to the loader axis B, i.e., does not rotate with respect to the frame 18. The housing 48 may be disposed to overlap with the belt 34 of the seed delivery mechanism 32 such that the housing 48 enters into the bristles of the belt 34 (see FIGS. 6 and 7). The delivery opening 56, which corresponds with the drop off location 42, thus opens into the belt 34 and specifically into the bristles of the belt 34 for depositing seeds therein. The seed loader 36 may be substantially centered about a centerline C of the belt 34 of the seed delivery mechanism 32 (see the side view of FIG. 6 and the top view of FIG. 9), or may be slightly offset in other constructions.

With reference to the construction of FIGS. 12-16, the housing 148 is journalled for rotation about the loader axis B by way of a bearing 165 disposed between the housing 148 and the shaft 144. This configuration may be applied to any construction in this disclosure. When the shaft 144 rotates, friction in the bearing 165 acts to couple the housing 148 for rotation in the direction of the shaft 144. Thus, the housing 148 is driven to rotate with the shaft 144. However, a stop 169 limits the range of motion of the housing 148 to a few degrees, e.g., about 5 to about 10 degrees, about 1 to about 30 degrees, about 1 to about 20 degrees, or about 1 to about 15 degrees, or about 1 to about 10 degrees, etc. When the stop 169 is reached, the shaft 144 rotates freely in the bearing 165 and the housing 148 remains against the stop 169. Projections 173 extending generally radially from the housing 148 and spaced apart by a radial gap 175 engage the stop 169 to inhibit rotating, or rocking, motion of the housing 148 in either direction, the stop 169 being disposed in the gap 175 radially between the projections 173. FIGS. 14-15 illustrate the housing 148 moving between a first position (FIG. 14) and a second position (FIG. 15) against the stop 169.

The housing 148 has a wall 177 disposed generally normal to the axis B and disposed just downstream of the sweeper 149 with respect to the direction of the seed delivery mechanism 32. In other words, the seed delivery mechanism 32 (e.g., the belt 34) moves past the sweeper 149 first and then the wall 177. The wall 177 includes a first wall 177a and a second wall 177b, which may be formed separately or as one piece, that rock into and out of overlapment with the seed delivery mechanism 32, e.g., the belt 34, such that the first wall 177a enters into the bristles of the belt 34 adjacent to and downstream from the sweeper 149 (with respect to the direction of seed delivery of the conduit 34, which is moving into the page in FIGS. 14 and 15) when the housing 148 rotates in one direction as shown with phantom lines in FIG. 15, and the second wall 177b enters into the bristles of the belt 34 adjacent to and downstream from the sweeper 149 when the housing 148 rotates in the other direction as shown in phantom lines in FIG. 14. Thus, the first and second walls 177a, 177b guide seeds from the first and second seed meters 22a, 22b, respectively, into an inner region of the seed delivery mechanism 32 proximate the centerline C rather than just to the edge of the seed delivery mechanism 32. The first and second walls 177a, 177b provide a backstop to inhibit the seed from being swept away into the seed delivery mechanism 32 until the seed reaches an inner region, such as near the center, of the seed delivery mechanism 32. In other words, the delivery opening 156, which corresponds with the drop off location 42, thus opens into an inner region of the belt 34, rather than the edge, and specifically into the inner region of the bristles of the belt 34 for depositing seeds therein. When the first wall 177a (FIG. 15) is overlapping the seed delivery mechanism 32, the second wall 177b is not, and vice versa. Thus, the first and second walls 177a, 177b alternate engagement into the seed delivery mechanism 32 in conjunction with a direction of rotation of the seed loader 136. As such, the housing 148 acts as a rocking segue to form a blocking wall (177a or 177b, alternately) so that the seed is deposited into the inner region of the brush belt 34. The housing 148 rocks from one side to the other to present the wall 177a, 177b extending into the brush belt 34 from one side or the other depending on the seed meter 22a, 22b that is operating. The walls 177a, 177b inhibit the seed from being swept away by the seed delivery mechanism 32 before the seed reaches a secure position in the inner region of the seed delivery mechanism 32.

Returning to the seed loaders 36, 136 the sweeper 49, 149 travels in a direction generally transverse to the direction of travel of the belt 34 where the sweeper 49, 149 and belt 34 meet (i.e., proximate the drop off location 42). Thus, the paddles 50, 150 sweep across the belt 34 and into the belt bristles laterally, i.e., transverse to the direction of movement of the belt 34, e.g., generally perpendicular to movement of the belt 34 or, in other constructions, transverse at any other angle with respect to movement of the belt 34. In other constructions, the sweeper 49, 149 may travel generally parallel with the direction of travel of the belt 34 proximate the drop off location 42, e.g., counter to the direction of travel of the belt 34 or concurrent with the direction of travel of the belt 34.

The seed loader 36, 136 is selectively driven to rotate in clockwise and counterclockwise directions by at least one motor, which may include the respective motor 30 driving the respective seed meters 22a, 22b (as shown in FIGS. 6-11), two motors independent from the seed meter motors 30 (not shown), a single independent motor (not shown), or a single seed meter motor 130 (FIG. 12). In any case, a mechanical drive 58, 158 (described below) coupled to the motor(s) includes gears and/or clutches to drive the seed meters 22a, 22b and the seed loader 36, 136 in a choreographed fashion. That is, based on the number of receptacles 38, 138 or paddles 50, 150 the shaft 44 may be controlled (e.g., mechanically by way of gears and clutches in the mechanical drive or electronically via a controller in other constructions) to operate at a speed that corresponds with the number, spacing, and speed of seeds being picked up by the seed meters 22a, 22b such that the paddle 50, 150 sweeps each metered seed sequentially. In yet other constructions, other types of motors, such as hydraulic or pneumatic motors, may be used as well as other types of mechanical drives. The motor(s) or other device may be controlled to operate in a specified direction depending on which seed meter 22a, 22b is active, or the seed meter motor(s) 30, 130 may be geared and clutched to drive the seed loader 36, 136 in the corresponding direction.

As illustrated in FIGS. 6-11, a mechanical drive 58 may be coupled to each side of the shaft 44 between the shaft 44 and the respective seed meter motor 30 for transferring driving force to drive the shaft 44 about the loader axis B. Thus, the seed loader 36 may be driven in one direction when the first seed meter 22a is operating and in an opposite direction when the second seed meter 22b is operating by the respective seed meter motor 30.

Figure 16:
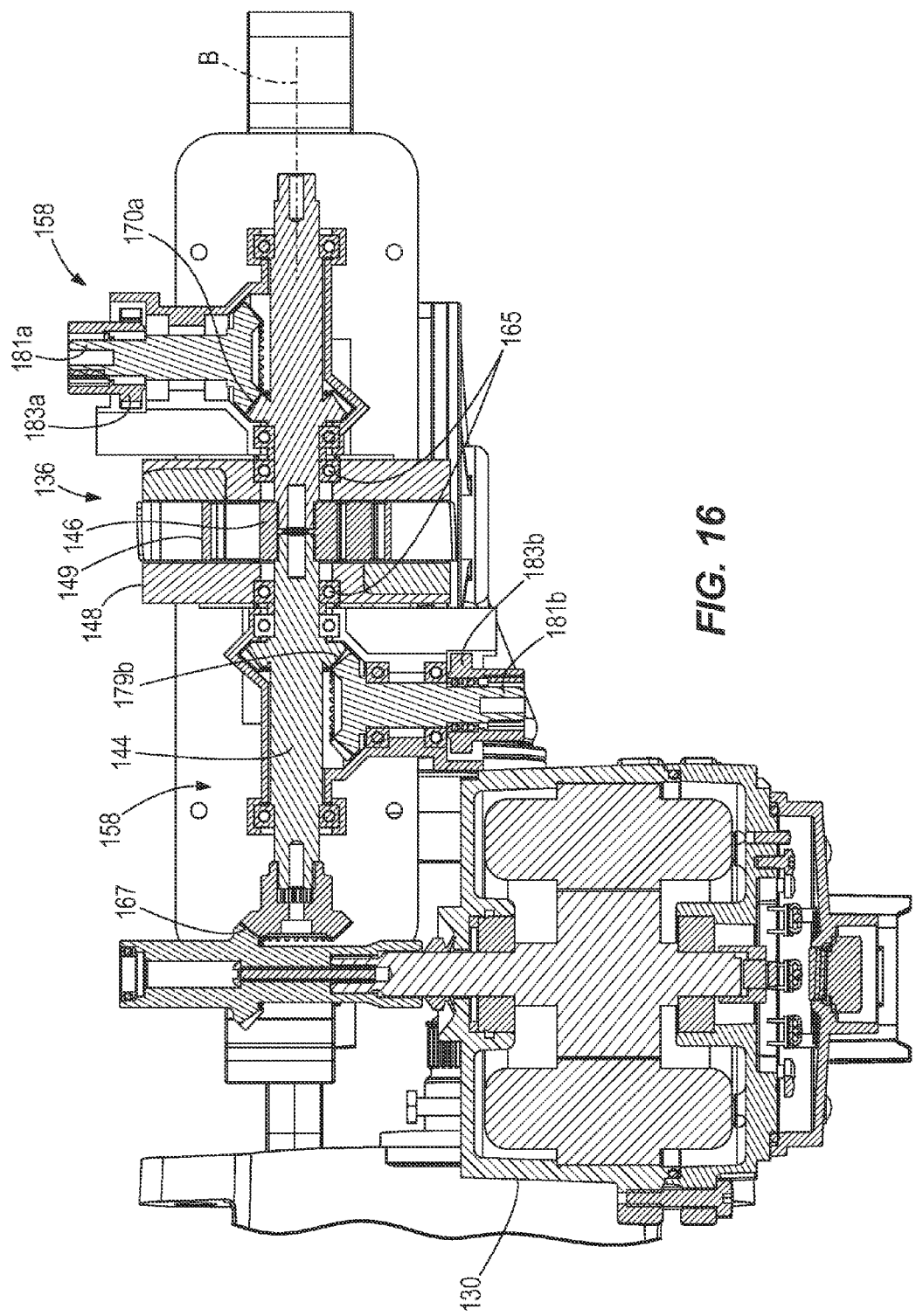
Figure 17:
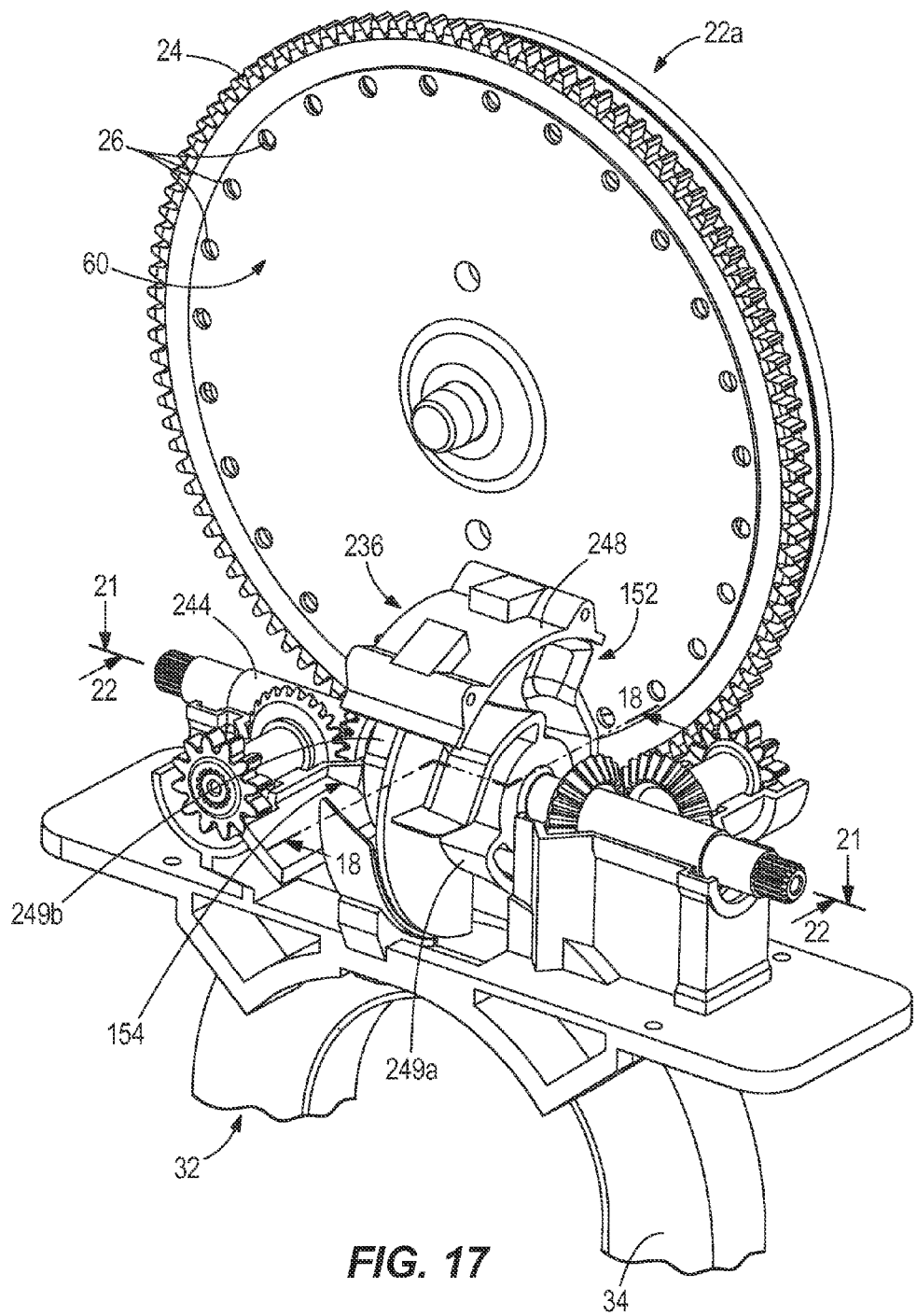
Figure 18:
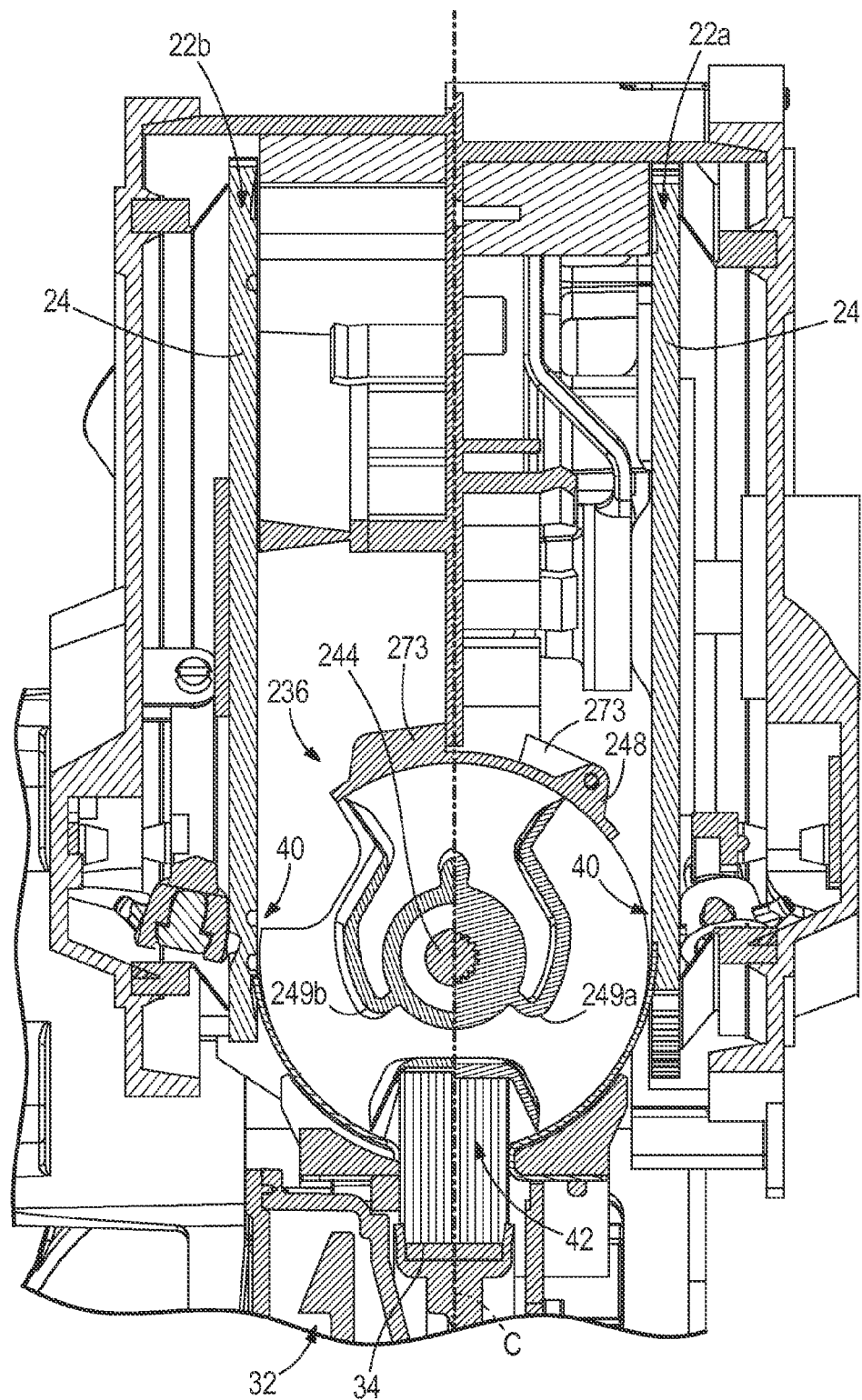

As illustrated in FIGS. 12-16, with particular reference to FIGS. 12 and 16, a motor 130, which may be a single reversible motor, and a mechanical drive 158 are configured to selectively drive one of the seed meters 22a, 22b and the seed loader 136 together such that the sweeper 149 is driven in a direction that corresponds with the seed meter 22a, 22b being driven to move seeds from the seed meter 22a, 22b being driven such that the paddles 150 are timed to meet with a seed from each passing aperture 26 in sequence. As illustrated, the mechanical drive 158 includes a shaft 144 coupled to the motor 130 by way of gears 167, such as bevel gears or another suitable type of coupling. The shaft 144 is driven in a first direction when the motor 130 is operated in a first direction and is driven in a second opposite direction when the motor 130 is driven in a second opposite direction. The mechanical drive 158 also includes meter gears 179a, 179b, such as bevel gears or another suitable type of coupling, coupled between the shaft 144 and the metering member 24 of the respective seed meter 22a, 22b. Specifically, the meter gears 179a, 179b are each coupled to a respective one-way clutch 181a, 181b disposed between the shaft 144 and the respective metering member 24 for driving the respective metering member 24 when motor 130 is operating in the respective direction. The one-way clutch 181a, 181b may include teeth 183a, 183b, or other suitable structure, for meshing with teeth 62, or other suitable structure, of the corresponding metering member 24. For example, when the motor 130 is driven in the first direction, the first seed meter 22a is driven through the first one-way clutch 181a and the second one-way clutch 181b freewheels such that the second seed meter 22b is not driven, and vice versa. Thus, an output of the motor is reversible. Alternatively, the motor 130 may be a single direction motor and the mechanical drive 158 may include a reverser (not shown) for reversing the direction of the output of the motor. In other constructions, the output of the motor may be reversible in other ways. As such, a single motor selectively drives one of the seed meters 22a, 22b and correspondingly drives the seed loader 136.

In operation, as the hub portion 46, 146 rotates within the housing 48, 148, the paddles 50, 150 sweep a seed from the first seed meter 22a or the second seed meter 22b as the paddles 50, 150 pass by the first meter opening 52, 152 and the second meter opening 54, 154, respectively. The paddles 50, 150 may sweep the seed up or down, depending on which way the sweeper 49, 149 rotates (as described in greater detail below). The first and second seed meters 22a, 22b may be selectively operated such that only one seed meter is metering seeds at a time. In this way, the first and second seed meters 22a, 22b may be controlled to provide a selected variety of seed to the seed delivery mechanism 32 for delivery to the furrow 15. In other constructions, both seed meters 22a, 22b may be operable to provide seeds at the same time.

In another construction, the seed loader 36 may rotate in a direction dependent on which of the first or second seed meters 22a, 22b is running. For example, the seed loader 36 may run counterclockwise when the first seed meter 22a is running and clockwise when the second seed meter 22b is running, such that the seeds need only be transferred in a circumferential path about the loader axis B of less than 180 degrees to the drop off location 42. The reverse may also be used such that the seeds are always transferred in an angular path about the loader axis B of greater than 180 degrees. It is to be understood that other angular distances may be used depending on the spacing of the first meter opening 52, the second meter opening 54, and the delivery opening 56. In other constructions, the seed loader 36, 136 may rotate about the loader axis B in a single direction (e.g., clockwise or counterclockwise). With reference to the schematic of FIG. 2, if the seed loader 36, 136 operates clockwise, a first seed is picked up at the pickup location 40 of the first seed meter 22a (if the first seed meter 22a is operating) and moved in a circumferential path about the loader axis B for greater than 180 degrees (e.g., about 270 degrees) to the drop off location 42, or a second seed is picked up at the pickup location 40 of the second seed meter 22b (if the second seed meter 22b is operating) and moved in a circumferential path about the loader axis B for less than 180 degrees (e.g., about 90 degrees) to the drop off location 42. The reverse of this operation may also be employed.

In other constructions, the seed loader 36, 136 may be oscillating, reciprocating, translating, or moving in other manners to pick up seeds at one or more meter openings 52, 54 and to discharge the seeds at the drop off location 42.

In yet other constructions, two or more seed loaders 36, 136 may be employed, e.g., one seed loader 36, 136 for every individual seed meter. Or, equivalently, the seed loader 36, 136 may include dual sweepers as described in greater detail below. As such, two seed loaders 36 (or sweepers 49, 149) may be used such that one seed loader always rotates in one direction for transferring seeds from the first seed meter 22a to the seed delivery mechanism 32, and the other seed loader always rotates in the same or an opposite direction for transferring seeds from the second seed meter 22b to the seed delivery mechanism 32.

Figure 21:
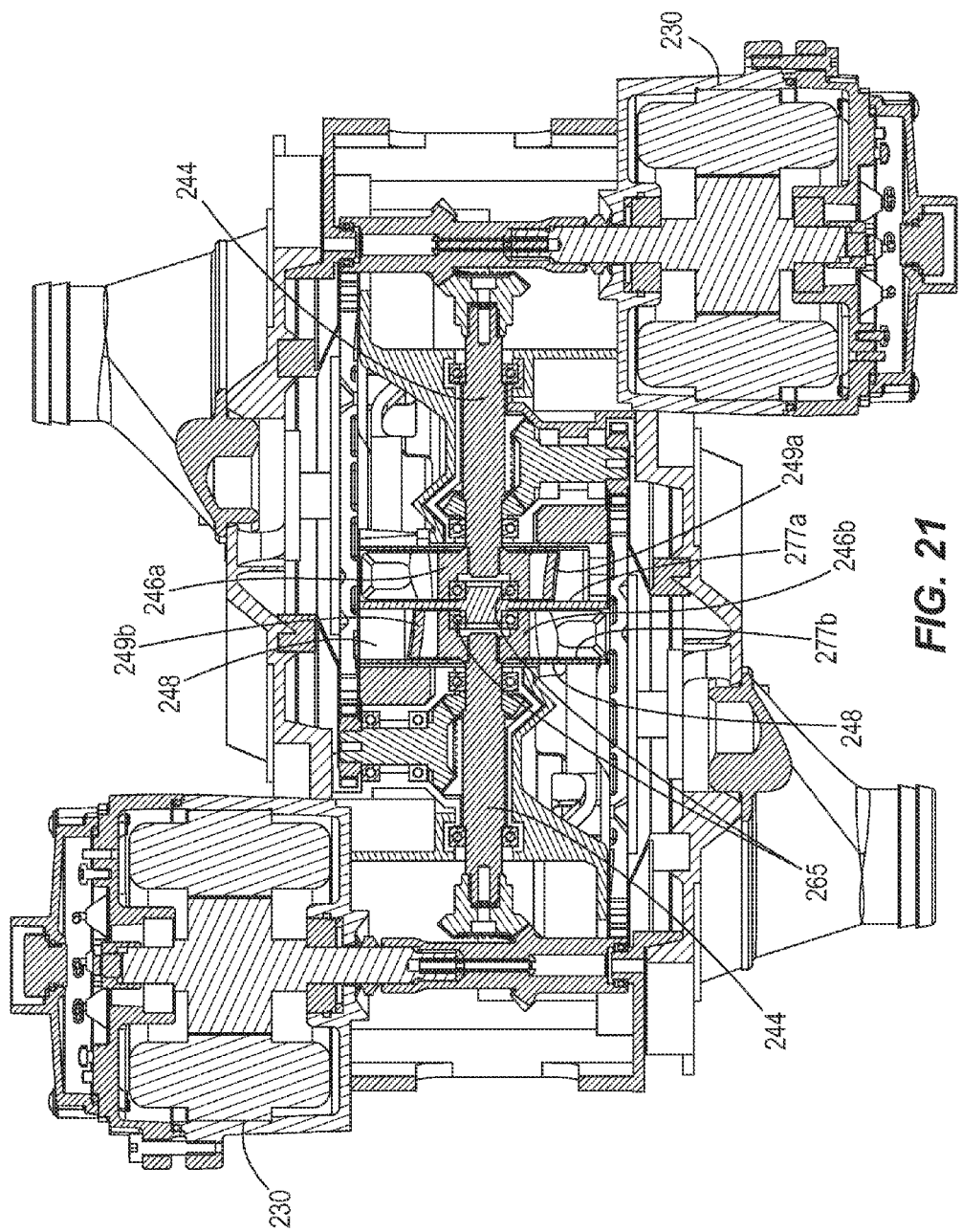
Figure 22:
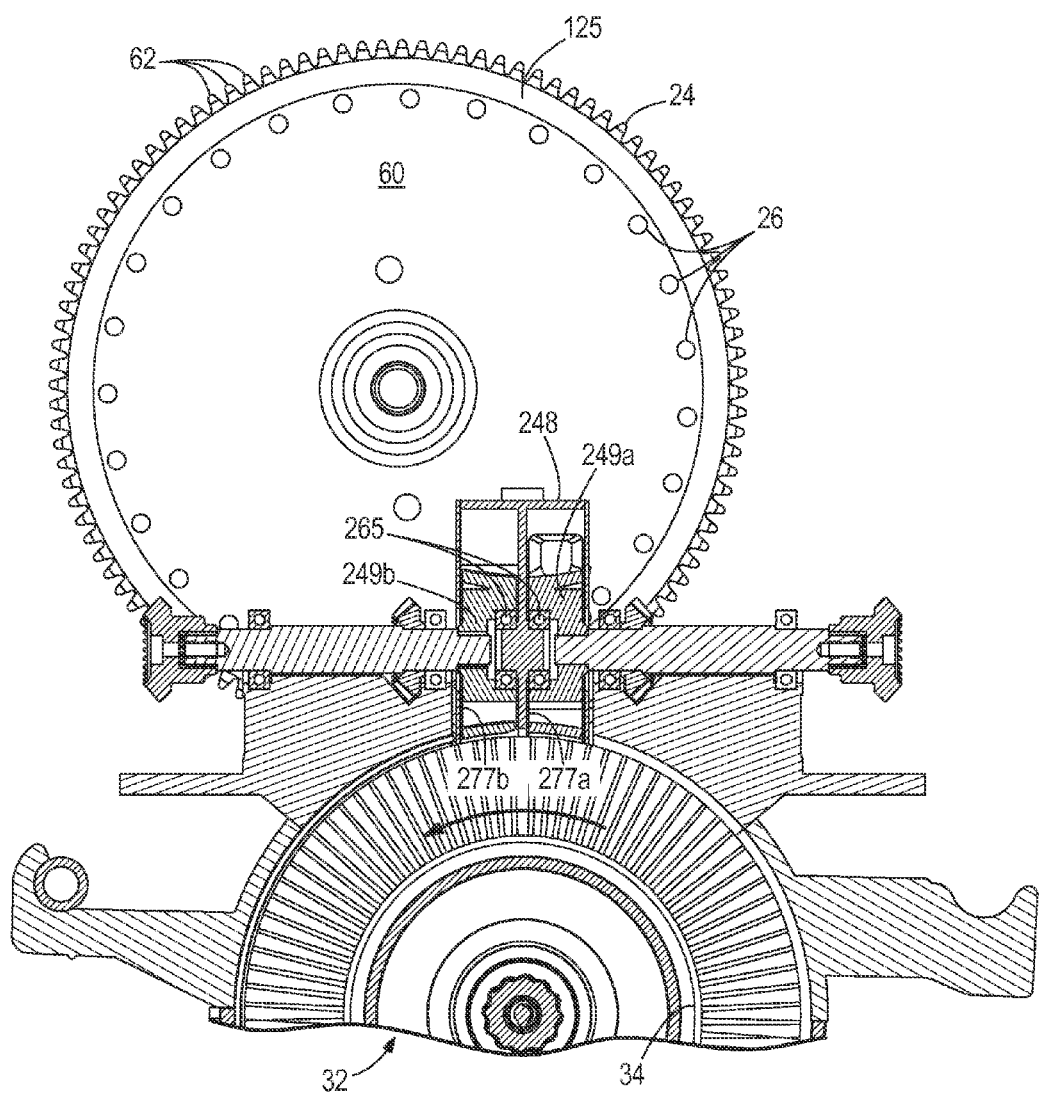
Figure 23:
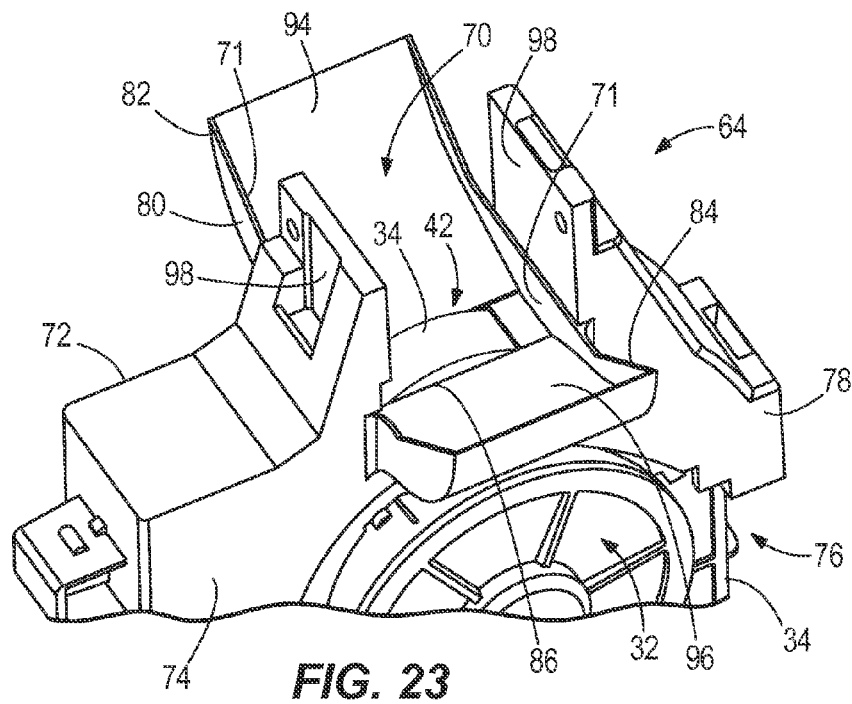
FIGS. 23-27 are various views of a pneumatic seed loader disposed in the seeding machine.

One example of such dual seed loaders is illustrated in FIGS. 17-22. A seed loader 236 includes two hub portions 246a, 246b and two sweepers 249a, 249b. The sweepers 249a, 249b include the same features as the sweeper 49 but are each driven in opposite directions. Like features are labeled in FIGS. 19-20 using the same reference numerals shown in FIGS. 3-5 plus 200 and need not be described again. Reference for the common features is made to the description above. The sweepers 249a, 249b are each dedicated to one seed meter 22a, 22b and configured to rotate when the corresponding seed meter 22a, 22b is in use. It is apparent from the disclosure above that many constructions exist for driving the sweepers 249a, 249b accordingly. For example, the hub portions 246a, 246b may be coupled to the same shaft 244 (e.g., like the shaft 144) driven by a single motor 130 and geared such that one of the sweepers 249a, 249b is driven when the shaft 144 rotates in one direction and the other of the sweepers 249a, 249b is driven when the shaft 144 rotates in the other direction. Alternatively, two separate shafts 244 may be employed, one for each hub portion 246a, 246b. In some constructions, one of the sweepers 249a, 249b is driven by a first motor (not shown) and the other of the sweepers 249a, 249b is driven by a second motor (not shown). The seed loader 236 may be driven by any of the motor and mechanical drive arrangements described above. In FIG. 21, the seed loader 236 is illustrated as being driven individually by separate seed meter motors 230.

The sweepers 249a, 249b are driven to rotate in opposite directions such that each paddle 250 sweeps a seed in a downward direction from top to bottom with respect to gravity. Thus, the seed loader 236 is a dual seed loader.

The seed loader 236 includes a single housing 248 mounted rotatably by bearings 265 and movable between a first position (FIG. 19) and a second position (FIG. 20), as described above with respect to the housing 148. Like features are given the same reference numeral as the corresponding features in the construction of FIGS. 12-16 plus 100. The wall differs from the wall 177 in that one wall 277a is disposed between the sweepers 249a, 249b and another wall 277b is disposed parallel to the one wall 277a. FIGS. 19-20 illustrate in greater detail the walls 277a, 277b in action. The wall 277a overlaps into the seed delivery mechanism 32 when one of the sweepers 249a is working (as shown by hatching in FIG. 19) and the other wall 277b overlaps into the seed delivery mechanism 32 when the other of the sweepers 249 is working (as shown by hatching in FIG. 20). As described above, the walls 277a, 277b are disposed generally normal to the loader axis B and disposed adjacent their respective sweepers 249 in a direction downstream as defined by the direction of motion of the seed delivery mechanism 32, which is shown by arrows in FIGS. 19-20. As such, the housing 248 acts as a rocking segue to form a blocking wall (277a or 277b) so that the seed is deposited into the center of the brush belt 34 as described above. The housing 248 rocks from one side to the other to present a wall 277a, 277b extending into the brush belt 34 from one side or the other depending on the seed meter 22a, 22b that is working.

Figure 25:
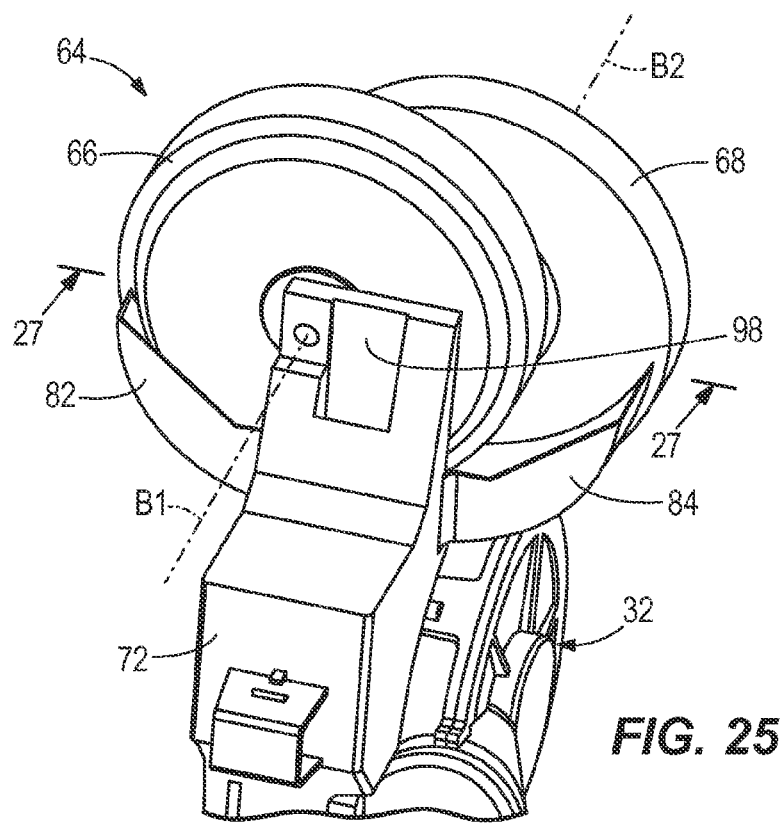
Figure 26:
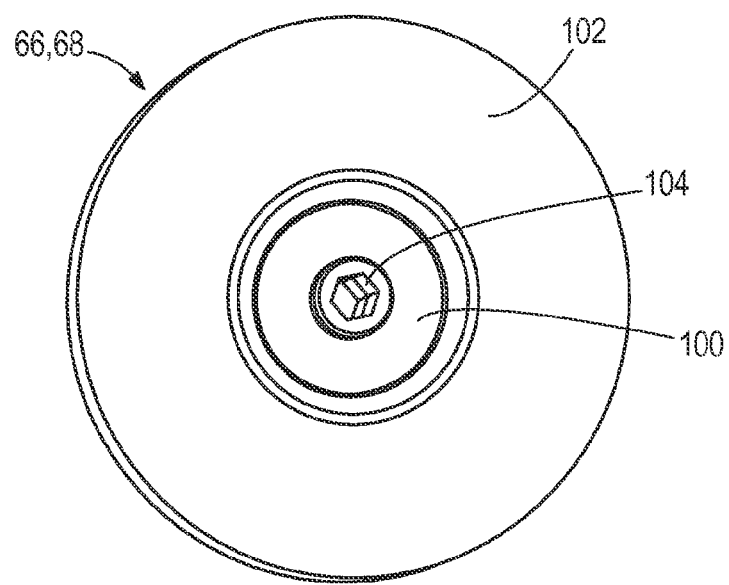
Figure 27:
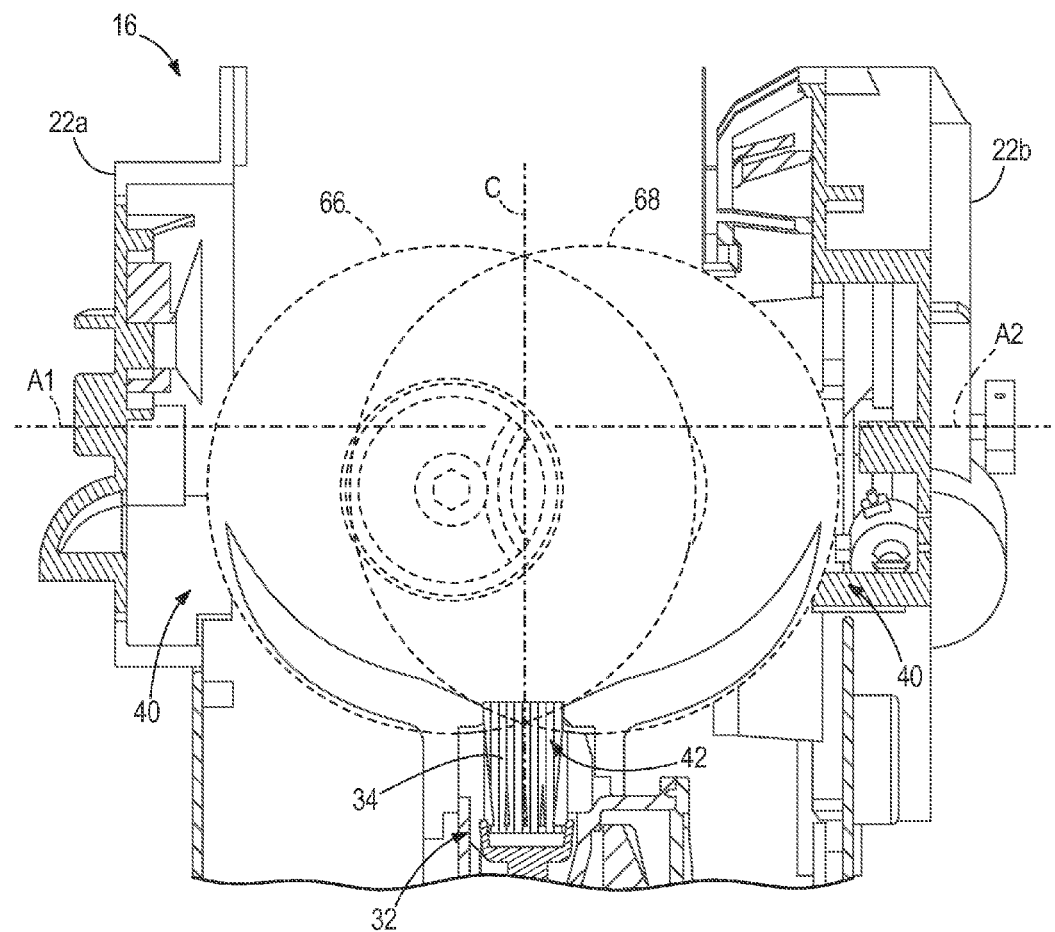
Figure 28:
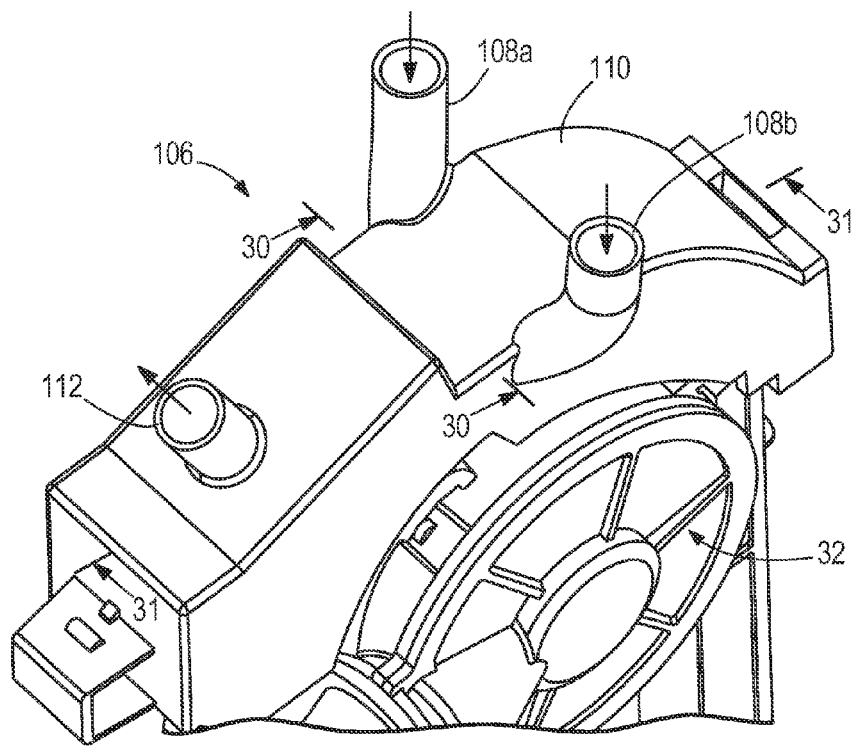
FIGS. 28-32 are various views of another pneumatic seed loader disposed in the seeding machine.

In the construction of FIGS. 23-27, two seed meters 22a, 22b are coupled to each row unit frame 18 (see FIG. 27) in a similar manner as described above with respect to FIGS. 2-22. As illustrated in FIG. 27, the first and second seed meters 22a, 22b are arranged generally in parallel such that the respective meter axes A1, A2 are generally parallel. In other constructions, the first and second meters 22a, 22b may be arranged such that the respective meter axes A1, A2 are generally coaxial or translationally offset, or the first and second meters 22a, 22b may be tilted with respect to each other such that the meter axes A1, A2 are offset by an included angle. In yet other constructions, a single seed meter (22a or 22b) can be configured to selectively meter seeds from two or more different seed sources (e.g., from the tanks 13a-13c). In still other constructions, three or more seed meters may be coupled to each row unit frame 18.

A seed loader 64 is coupled to the frame 18 of each row unit 14. The seed loader 64 includes a first wheel 66 disposed between the first seed meter 22a and the seed delivery mechanism 32, and a second wheel 68 disposed between the second seed meter 22b and the seed delivery mechanism 32 and offset from the first wheel 66. The first and second seed meters 22a, 22b of the illustrated embodiment are arranged generally in parallel with each other by way of example only, and the seed loader 64 is positioned for selectively receiving metered seeds from the first and second seed meters 22a, 22b and transferring seeds to the seed delivery mechanism 32.

The seed loader 64 cooperates with a loader baffle 80 disposed on or integrally formed with a seed delivery shroud 72 to transfer the metered seeds toward the drop off location 42. The seed delivery shroud 72 includes a mounting portion 74 coupled to a receiving portion 76 of the seed delivery mechanism 32 proximate the drop off location 42 where seed is received on the seed delivery mechanism 32. The seed delivery shroud 72 may be coupled to the seed delivery mechanism 32 by way of a clamp 78. In other constructions, the seed delivery shroud 72 may be coupled to the seed delivery mechanism 32 by way of a snap-fit, a fastener, or in any other suitable manner. In yet other constructions, the seed delivery shroud 72 may be formed with a housing of the seed delivery mechanism 32.

The loader baffle 80 includes a first arm 82 disposed adjacent the first wheel 66, a second arm 84 disposed adjacent the second wheel 68, and a delivery opening 86 therebetween to facilitate the passing of seed to the seed delivery mechanism 32. In other constructions, the seed delivery shroud 72 may include a single arm 82, 84 (e.g., in embodiments in which both wheels 66, 68 rotate in the same direction), and/or two or more delivery openings, one for each of the first and second wheels 66, 68, respectively. In the illustrated embodiment, the arms 82, 84 define a trough 70 with opposite sides 71 between and within which a periphery of each wheel 66, 68 is received and along which seeds are moved by the wheels 66, 68 to the delivery opening 86. The trough 70 can have various lengths depending at least in part upon the circumferential distance between the pickup locations 40 and the delivery opening 86, and can have various widths depending at least in part upon the widths of the wheels 66, 68. Also, in some embodiments, the trough 70 has generally rotund shape that is elongated proximate the delivery opening 86 in order to receive seeds from wheels 66, 68 that are offset (such as the wheels shown in the illustrated embodiment of FIGS. 23-27), whereas in other embodiments the trough is round in order to receive seeds from the wheels 66, 68 that are co-axial.

Returning to FIGS. 23-27, the first arm 82 includes a curved or arcuate surface 94 that generally corresponds with the contour of the first wheel 66, and the second arm 84 includes a curved or arcuate surface 96 that generally corresponds with the contour of the second wheel 68. The first and second arms 82, 84 extend from proximate the pickup locations 40 adjacent the first and second seed meters 22a, 22b, respectively, to the delivery opening 86. In other constructions, a single arm may be employed, and a single wheel may be disposed adjacent a single seed meter and used to transfer metered seeds from the single seed meter (22a or 22b) to the seed delivery mechanism 32.

Figure 24:
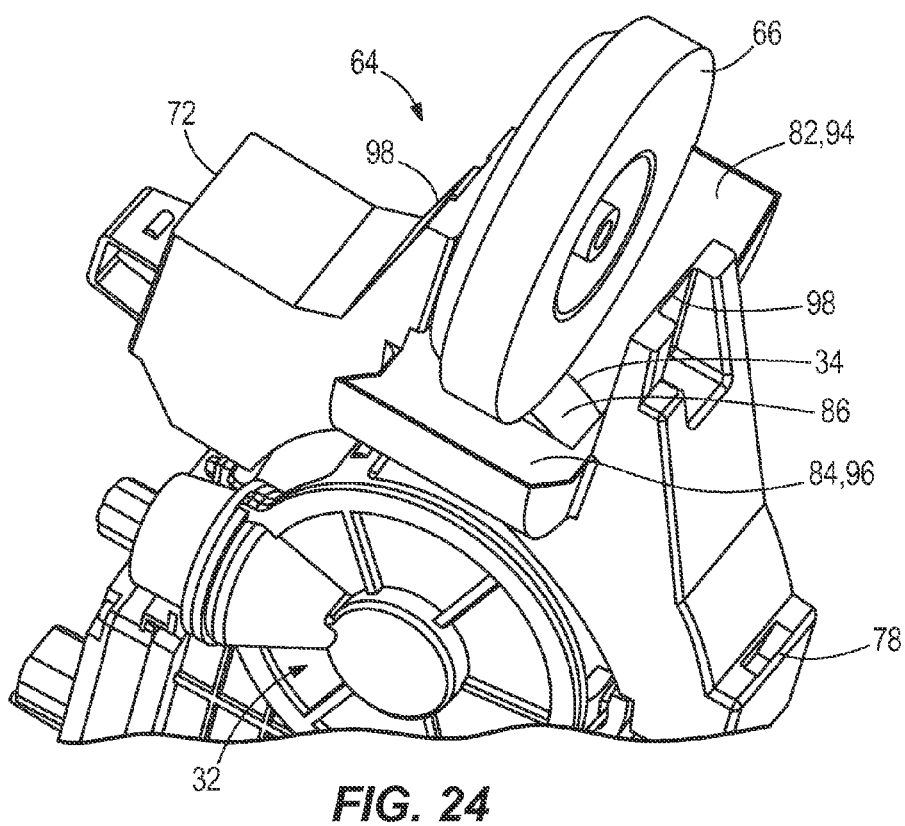

In the illustrated construction, the first and second wheels 66, 68 are mounted for rotation about respective loader axes B1, B2 disposed generally perpendicular to at least one or both of the meter axes A1, A2. In some constructions, e.g., when one or both of the first and second seed meters 22a, 22b are slightly tilted, the loader axes B1, B2 may be disposed transverse but not necessarily perpendicular to the meter axes A1, A2. With reference to FIGS. 24 and 25, the first and second wheels 66, 68 are rotatably mounted to the seed delivery shroud 72 at respective bracket portions 98 extending from the seed delivery shroud 72. As illustrated in FIGS. 25 and 27, the first and second wheels 66, 68 are slightly offset from the centerline C of the seed delivery mechanism 32 defined by the centerline of the belt 34 such that seeds may be dropped substantially on the centerline C of the belt 34 when the first and second wheels 66, 68 lose tangency with the belt 34. In other constructions, the first and second wheels 66, 68 may be coaxial and/or may be offset from the centerline C of the belt 34.

As illustrated in greater detail in FIG. 26, each of the first and second wheels 66, 68 includes a hub portion 100 and a sweeper 102 extending from the hub portion 100. The hub portion 100 is coupled to a shaft (not shown) for rotation therewith about respective the loader axis B1, B2, and may be driven in a similar manner to the seed loader 36 described above. For example, the hub portion 100 may include a hex opening 104 for engaging a hex shaft (not shown).

The illustrated sweeper 102 includes a brush having bristles extending radially from the hub portion 100 for sweeping a seed from a seed meter 22a, 22b. The bristles of the first and second wheels 66, 68 may slightly overlap the bristles of the belt 34 (FIG. 27) for opening the bristles of the sweeper 102 and/or belt 34 to assist transfer of the seeds. Rather than bristles, the sweeper 102 may also include other mechanisms for sweeping the seed, such as paddles, foam, resilient fingers, other brushes, etc.

In operation, the first and second wheels 66, 68 sweep a seed from the first or second seed meters 22a, 22b, respectively. The first and second wheels 66, 68 may sweep the seed up or down, depending on which way the sweeper 102 rotates (as described in greater detail below). The first and second seed meters 22a, 22b may be selectively operated such that only one seed meter 22a, 22b meters seeds at a time. In this way, the first and second seed meters 22a, 22b may be controlled to provide a selected variety of seed to the seed delivery mechanism 32 for delivery to the furrow 15. In other constructions, both seed meters 22a, 22b may be operable to meter seeds at the same time.

More specifically, as illustrated in FIGS. 24-27, the first and second wheels 66, 68 are configured for receiving or sweeping a seed from the respective seed meters 22a, 22b at the pickup location 40. Each wheel 66, 68 rotates about the loader axis B1, B2 to move the seed in a circumferential path about the loader axis B1, B2 to transfer the seed to the seed delivery mechanism 32 at the drop off location 42. The loader baffle 80 (specifically, the respective surface 94, 96) cooperates with the first and second wheels 66, 68 to guide the seed along the circumferential path to the delivery opening 86.

In one construction, the first and second wheels 66, 68 each rotate about the loader axis B1, B2 in a single direction (e.g., clockwise or counterclockwise). For example, the first wheel 66 rotates clockwise and the second wheel 68 rotates counterclockwise, or vice versa, or both first and second wheels 66, 68 rotate in the same direction. By way of example, and with reference to FIG. 26, if the first wheel 66 operates counterclockwise, a seed is picked up at the pickup location 40 of the first seed meter 22a and moved about the loader axis B1 for about 90 degrees to the drop off location 42. If the second wheel 68 operates clockwise, a seed is picked up at the pickup location 40 of the second seed meter 22b and moved about the loader axis B2 for about 90 degrees to the drop off location 42. The reverse or any combination of directions and configurations (e.g., different angular distances) may also be employed, in which case the seed loader 64 can include walls proximate and circumferentially extending about upper portions of either or both wheels 66, 68 in a manner similar to the arms 82, 84 described above. In other constructions, the seed loader 64 may be oscillating, reciprocating, translating, etc. In yet other constructions, one, three, or more wheels may be employed for feeding seeds to one or more pickup locations 40 of the same seed loader. In such cases, the width of the seed loader (e.g., the width of arm 82 and/or arm 84 can be increased or decreased as necessary to receive the periphery of the wheels.

In the construction of FIGS. 28-32, one, two, or more seed meters 22a, 22b may be employed as described above with respect to FIGS. 2-27. In the illustrated construction, first and second seed meters 22a, 22b (not shown) are each configured to drop a metered seed from the pickup location 40 into or near a respective pressure conduit 108a, 108b of a seed loader 106. One pressure conduit 108a, 108b may be disposed adjacent each seed meter 22a, 22b or, alternatively, the seed loader 106 only includes one pressure conduit in communication with a seed meter (22a or 22b) in those applications utilizing only a single seed meter. The seed loader 106 includes a seed delivery shroud 110 positioned between the first and second seed meters 22a, 22b and the seed delivery mechanism 32 proximate the drop off location 42 (as described above with respect to FIGS. 22-26). The seed delivery shroud 110 is integrated with or integrally formed as one piece with at least a portion of the first pressure conduit 108a and the second pressure conduit 108b, although in other embodiments these elements can be separate pieces connected together in any suitable manner. The illustrated seed delivery shroud 110 is coupled to the seed delivery mechanism 32 by way of a clamp 122. However, in other constructions, the seed delivery shroud 110 may be coupled to the seed delivery mechanism 32 by way of a snap-fit, a fastener, or in any other suitable manner. The seed delivery shroud 110 is further configured to be coupled to a pressure differential device (not shown), such as an air pump or a vacuum pump. Either positive pressure or negative pressure may be employed.

Figure 29:
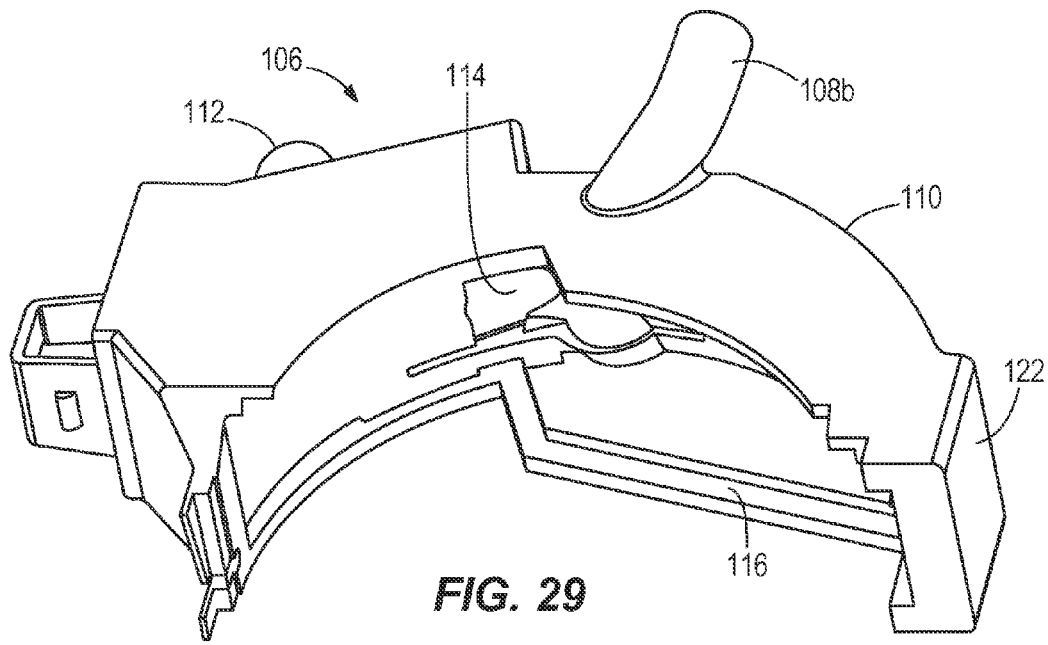
Figure 30:
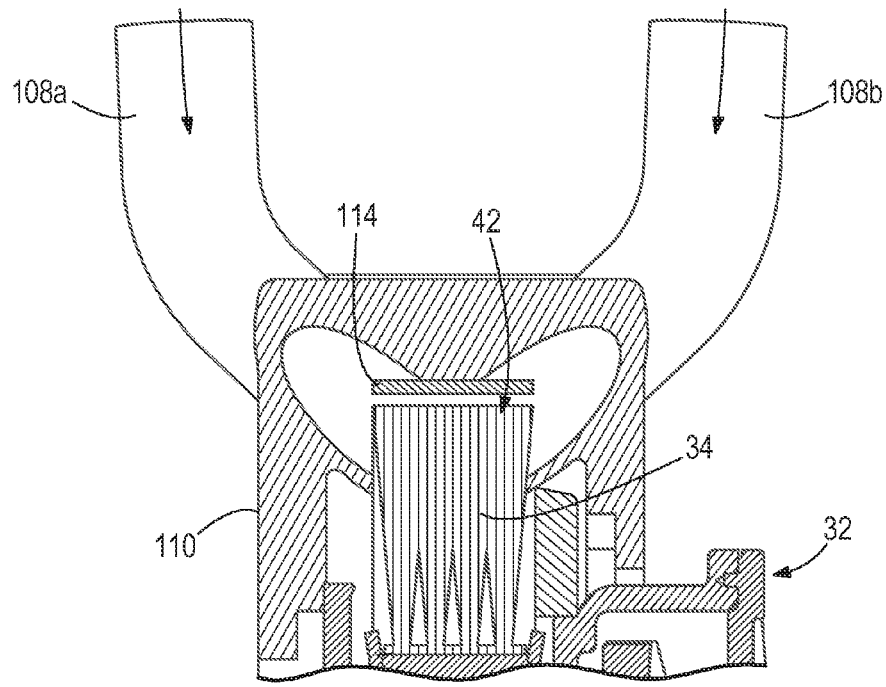
Figure 31:
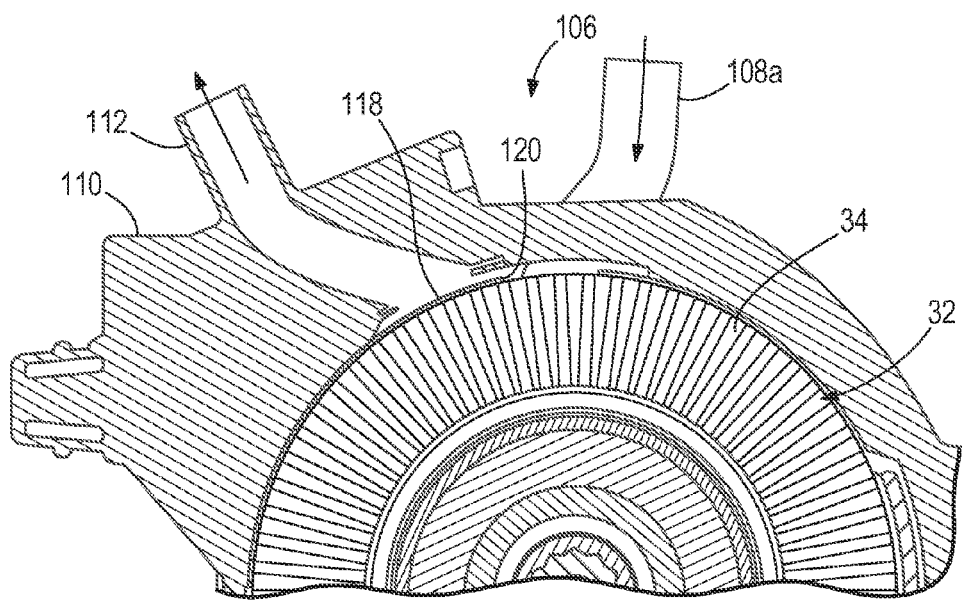
Figure 32:
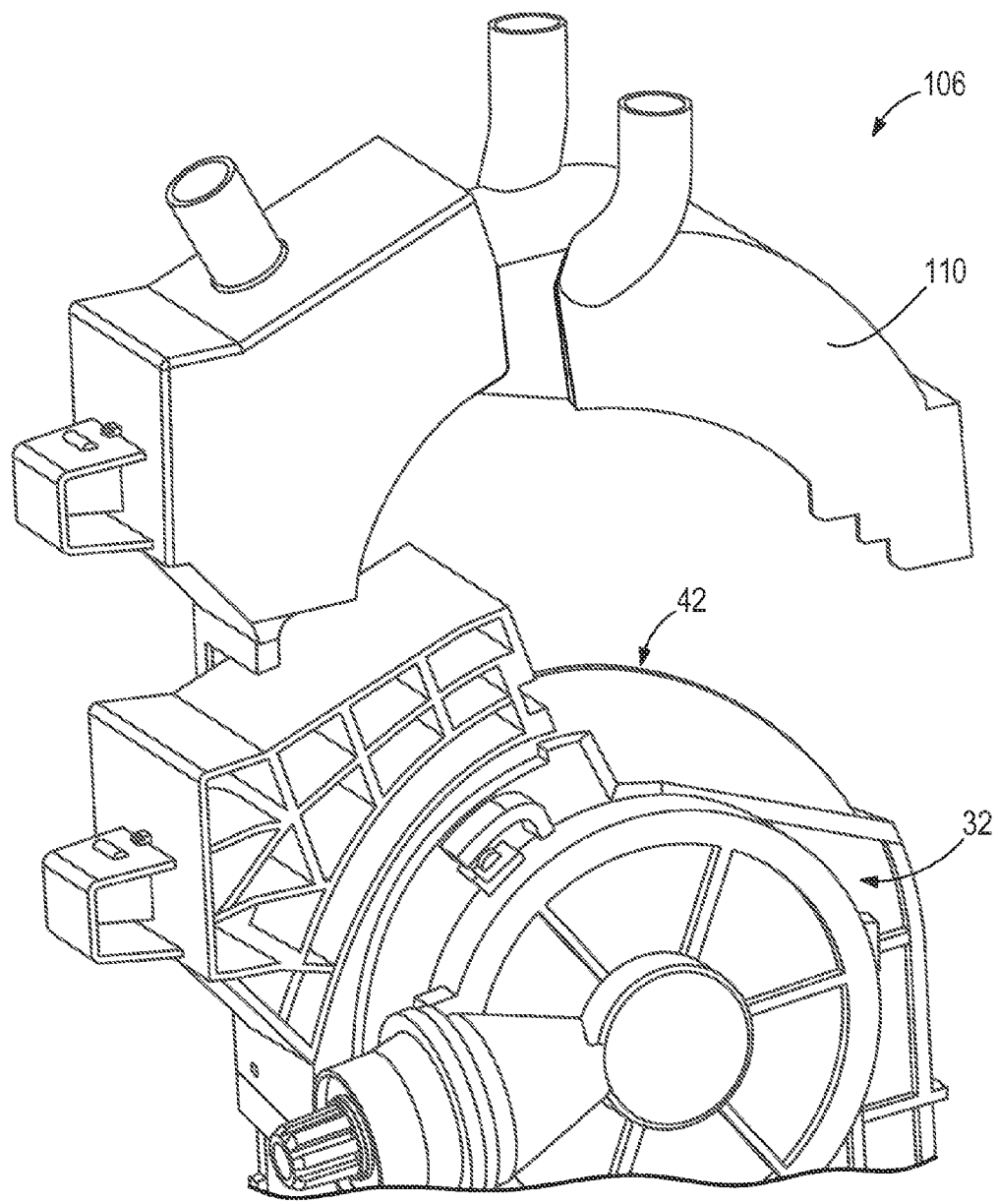

As indicated by the arrows in FIGS. 30 and 31, the seed delivery shroud 110 can be coupled to a vacuum source by way of a suction tube 112. Thus, the first and second pressure conduits 108a, 108b, which extend to and end proximate the drop off location 42 (see FIG. 32), are subjected to a vacuum for drawing the metered seeds from the first or second seed meter 22a, 22b. As illustrated in FIG. 29, a screen 114 is disposed near the end of the suction tube 112 to inhibit seeds from entering the suction tube 112. Also, a seal ledge 116 is provided for sealing the seed delivery shroud 110 to a housing of the seed delivery mechanism. It will be appreciated that the shape and configuration of the seed delivery shroud 110 can be changed in number of different manners to define a sealed interface between the seed delivery shroud 110 and the housing of the seed delivery mechanism. A liner 118 may be provided, as illustrated in FIG. 30, having an opening 120 positioned proximate the drop off location 42 for encouraging seeds to enter into the seed delivery mechanism 32 at the drop off location 42. The liner 118 may be made of a metal or other suitable low-wearing material for inhibiting wear on the seed delivery shroud 110 as the belt 34 and the seeds pass therealong. The liner 118 may also act as a primary screen or guard against seeds entering the suction tube 112.

In other constructions, a positive pressure may be used in place of or in addition to the above-described vacuum pressure to urge metered seeds to pass along the pressure conduits 108a, 108b into the seed delivery mechanism 32. In those constructions in which no vacuum pressure is utilized, the suction tube 112 is not necessary, and positive pressure is delivered to the seed delivery mechanism 32 (e.g., into the seed delivery shroud 110) by way of an air pump or other device positioned and operable to produce a source of positive pressure down the pressure conduits 108a, 108b. The positive pressure may be exhausted naturally through cracks in the seed delivery mechanism 32, or an exhaust vent (not shown) may be provided in the seed delivery mechanism 32 or in the seed delivery shroud 110. As noted above, in yet other embodiments, both a source of positive pressure and a source of negative pressure (vacuum) can be used concurrently with the seed loader 106.

Although two pressure conduits 108a, 108b are utilized in the illustrated embodiment of FIGS. 28-32 each of which extends to a respective seed meter feeding the pressure conduits 108a, 108b with metered seed, it should be noted that any number of pressure conduits 108a, 108b can be provided on the seed delivery shroud 110 for supplying metered seed to the seed delivery mechanism 32. For example, the seed loader 106 can have a single pressure conduit 108a feeding seed to the seed delivery mechanism 32. In other embodiments, three or more pressure conduits 108a, 108b can feed seed to the seed delivery mechanism 32. Pressure conduits 108a, 108b (in any number) can each terminate at or proximate the drop-off location 42 in the illustrated embodiment for delivering seed to the drop-off location 42, or can terminate in one or more other drop-off locations 42 located proximate the periphery of the seed delivery mechanism 32. In this regard, any number of drop-off locations are possible for any number of pressure conduits 108a, 108b of the seed delivery shroud 110. Also, one or more of the pressure conduits 108a, 108b can be fed by two or more upstream seed meters, such as in cases where two or more seed meters deliver to a common seed input leading to the same pressure conduit 108a or 108b.

Thus, the disclosure provides, among other things, a seed loader for selectively transferring seeds from one, two or more seed meters to a seed delivery mechanism such that a single seed delivery mechanism (i.e., for a single row unit on the seeding machine) is configured to selectively deposit one, two, or more seed varieties.

What is claimed is:
1. A row unit for a seeding machine comprising:
   a first seed meter having a first metering member for singulating seeds;
   a second seed meter having a second metering member for singulating seeds; and
   a motor operably coupled to the first and second seed meters, wherein an output of the motor is reversible to selectively drive the first seed meter or the second seed meter.
2. The row unit for a seeding machine of claim 1, wherein the motor is a reversible motor configured to drive the first seed meter when operating in a first motor direction and to drive the second seed meter when operating in a second motor direction.

3. The row unit for a seeding machine of claim 1, wherein the motor is a one-way motor, the row unit further comprising a reverser for selectively reversing the direction of the output of the motor.

4. The row unit for a seeding machine of claim 1, further comprising a seed loader, wherein the motor is operably coupled to drive the seed loader in conjunction with the selected first or second seed meter.

5. The row unit for a seeding machine of claim 1, further comprising:
at least one shaft disposed between the motor and at least one of the first or second seed meters; and
a mechanical drive coupled to the shaft and configured to selectively operatively couple the motor to the first seed meter in a first mode and selectively operatively couple the motor to the second seed meter in a second mode.

6. The row unit for a seeding machine of claim 5, wherein the first mode is effectuated by operation of a motor output in a first direction and the second mode is effectuated by operation of the motor output in a second direction, wherein the mechanical drive includes a first one-way clutch disposed between the shaft and the first seed meter and a second one-way clutch disposed between the shaft and the second seed meter.

7. The row unit for a seeding machine of claim 1, further comprising:
a mechanical drive disposed between the motor and the first and second seed meters, the mechanical drive configured to selectively operatively couple the motor to the first seed meter in a first mode and selectively operatively couple the motor to the second seed meter in a second mode.

8. The row unit for a seeding machine of claim 7, wherein the first mode is effectuated by operation of a motor output in a first direction and the second mode is effectuated by operation of the motor output in a second direction.

9. The row unit for a seeding machine of claim 8, wherein the mechanical drive includes a first one-way clutch disposed between the shaft and the first seed meter and a second one-way clutch disposed between the shaft and the second seed meter.

10. The row unit for a seeding machine of claim 1, further comprising:
a seed loader disposed in communication with the first and second seed meters for receiving seeds from the first or second seed pool; and
a mechanical drive selectively coupling the motor to the first and second seed meters, wherein the mechanical drive operatively couples the motor to one of the first or second seed meters and simultaneously operatively couples the motor to the seed loader.

11. The row unit for a seeding machine of claim 10, wherein the mechanical drive is operable to time movement of the seed loader with movement of the one of the first or second seed meters.

12. The row unit for a seeding machine of claim 11, wherein the mechanical drive includes gears for timing the movement of the seed loader and one-way clutches for selectively coupling the motor to the first and second seed meters.

13. A row unit for a seeding machine comprising:
a first seed reservoir for holding a first variety of seeds;
a second seed reservoir for holding a second variety of seeds;
a seed meter assembly in communication with the first and second seed reservoirs for selectively moving seeds from the first seed reservoir or the second seed reservoir; and
a motor operably coupled to the seed meter assembly, wherein an output of the motor is reversible to selectively drive movement of seeds from the first seed reservoir or from the second seed reservoir.

14. The row unit for a seeding machine of claim 13, wherein the seed meter assembly includes a first metering member for moving seeds from the first seed reservoir and a second metering member for moving seeds from the second seed reservoir.

15. The row unit for a seeding machine of claim 13, further comprising a seed loader in communication with the seed meter assembly, the seed loader including a first opening for receiving seeds from the first seed reservoir and a second opening for receiving seeds from the second seed reservoir.

16. The row unit for a seeding machine of claim 13, further comprising:
a mechanical drive disposed between the motor and the seed meter assembly, the mechanical drive configured to selectively operatively couple the motor to the seed meter assembly in a first mode and for driving movement of seeds from the first seed reservoir and selectively operatively couple the motor to the seed meter assembly in a second mode for driving movement of seeds from the second seed reservoir.

17. The row unit for a seeding machine of claim 16, wherein the first mode is effectuated by operation of a motor output in a first direction and the second mode is effectuated by operation of the motor output in a second direction.

18. The row unit for a seeding machine of claim 17, wherein the mechanical drive includes a first one-way clutch disposed between the motor and the seed meter assembly and a second one-way clutch disposed between the shaft and the seed meter assembly.

19. A row unit for a seeding machine comprising:
a first metering member for singulating seeds;
a second metering member for singulating seeds;
a motor operably coupled to the first and second metering members to selectively drive the first metering member or the second metering member; and
a one-way clutch operatively disposed between the motor and at least one of the first or second metering members for selectively driving the at least one of the first or second metering members based on a direction of rotation of input to the clutch.

20. The row unit of claim 19, further comprising a motor having a reversible output providing the input to the one-way clutch, wherein the motor output is drivingly connected to the one of the first or second metering members when rotated in a first direction and drivingly disconnected from the one of the first or second metering members when rotated in a second direction.

* * * * *